(12) United States Patent
Shimizu et al.

(10) Patent No.: US 11,912,813 B2
(45) Date of Patent: Feb. 27, 2024

(54) URETHANE RESIN USING POLYROTAXANE, AND PAD FOR POLISHING

(71) Applicant: TOKUYAMA CORPORATION, Shunan (JP)

(72) Inventors: Yasutomo Shimizu, Tsukuba (JP); Takayoshi Kawasaki, Tsukuba (JP); Mitsuki Tochi, Urayasu (JP)

(73) Assignee: TOKUYAMA CORPORATION, Shunan (JP)

( * ) Notice: Subject to any disclaimer, the term of this patent is extended or adjusted under 35 U.S.C. 154(b) by 756 days.

(21) Appl. No.: 17/045,553

(22) PCT Filed: Apr. 8, 2019

(86) PCT No.: PCT/JP2019/015355
§ 371 (c)(1),
(2) Date: Oct. 6, 2020

(87) PCT Pub. No.: WO2019/198675
PCT Pub. Date: Oct. 17, 2019

(65) Prior Publication Data
US 2021/0155736 A1   May 27, 2021

(30) Foreign Application Priority Data

Apr. 10, 2018   (JP) .................................. 2018-075749
Dec. 7, 2018    (JP) .................................. 2018-230419

(51) Int. Cl.
| | | |
|---|---|---|
| C08G 18/10 | (2006.01) | |
| C08K 7/22 | (2006.01) | |
| C08L 87/00 | (2006.01) | |
| B24B 37/24 | (2012.01) | |

(Continued)

(52) U.S. Cl.
CPC ............. C08G 18/10 (2013.01); B24B 37/24 (2013.01); C08G 18/64 (2013.01); C08G 83/007 (2013.01);
(Continued)

(58) Field of Classification Search
CPC .......... C08G 18/64; C08G 18/10; C08K 7/22; C08L 75/04; C08L 87/005
See application file for complete search history.

(56) References Cited

U.S. PATENT DOCUMENTS

| | | | |
|---|---|---|---|
| 10,259,940 B2 | 4/2019 | Hayashi | |
| 2002/0197484 A1* | 12/2002 | Nishizawa | ................ B32B 7/04 428/423.1 |

(Continued)

FOREIGN PATENT DOCUMENTS

| | | |
|---|---|---|
| CN | 105273391 A | 1/2016 |
| JP | 2007-77207 A | 3/2007 |

(Continued)

OTHER PUBLICATIONS

Chinese Office Action and Search Report for corresponding Chinese Application No. 201980025140.5, dated Oct. 27, 2021.
(Continued)

*Primary Examiner* — Michael L Leonard
(74) *Attorney, Agent, or Firm* — Birch, Stewart, Kolasch & Birch, LLP

(57) ABSTRACT

The present invention relates to a urethane resin obtained by reacting a polymerizable composition containing at least a urethane prepolymer (B2) having an iso(thio)cyanate group at an end of a molecule thereof, which is obtained by reacting a bifunctional active hydrogen-containing compound (C1) having two groups having active hydrogen in a molecule thereof and a bifunctional iso(thio)cyanate group-containing compound (B1) having two iso(thio)cyanate
(Continued)

groups in a molecule thereof, a polyrotaxane (A) having a composite molecular structure formed by an axial molecule and a plurality of cyclic molecules clathrating the axial molecule, in which side chains having a group having active hydrogen are introduced into at least a part of the cyclic molecules, and a polyfunctional active hydrogen-containing compound (C2) other than the polyrotaxane (A) and having three or more groups having active hydrogen in a molecule thereof. In accordance with the present invention, it is possible to provide a urethane resin for a sliding member with high abrasion resistance and capable of being suitably used as a polishing pad.

13 Claims, 1 Drawing Sheet

(51) Int. Cl.
    *C08G 18/64* (2006.01)
    *C08G 83/00* (2006.01)
    *C08L 75/04* (2006.01)

(52) U.S. Cl.
    CPC ............... *C08K 7/22* (2013.01); *C08L 75/04* (2013.01); *C08L 87/005* (2013.01)

(56) References Cited

U.S. PATENT DOCUMENTS

| | | | |
|---|---|---|---|
| 2005/0171225 A1* | 8/2005 | Kulp | ........... C08G 18/4854 521/155 |
| 2009/0030108 A1 | 1/2009 | Ito et al. | |
| 2016/0002444 A1 | 1/2016 | Yun et al. | |
| 2018/0312643 A1 | 11/2018 | Shimizu et al. | |
| 2018/0371199 A1 | 12/2018 | Hayashi et al. | |
| 2019/0263961 A1 | 8/2019 | Shimizu et al. | |

FOREIGN PATENT DOCUMENTS

| | | |
|---|---|---|
| JP | 2011-241401 A | 12/2011 |
| JP | 2014-66857 A | 4/2014 |
| JP | 2015-178558 A | 10/2015 |
| JP | 2017-48305 A | 3/2017 |
| JP | 2017-75301 A | 4/2017 |
| JP | 2017-105959 A | 6/2017 |
| WO | WO 2006/115255 A1 | 11/2006 |
| WO | WO 2015/159875 A1 | 10/2015 |
| WO | WO 2015/174187 A1 | 11/2015 |
| WO | WO 2016/114243 A1 | 7/2016 |
| WO | WO 2016/143910 A1 | 9/2016 |
| WO | WO 2017/038865 A1 | 3/2017 |
| WO | WO 2017/130998 A1 | 8/2017 |
| WO | WO 2018/092826 A1 | 5/2018 |
| WO | WO 2019/069694 A1 | 4/2019 |

OTHER PUBLICATIONS

Extended European Search Report for corresponding European Application No. 19784934.2, dated Dec. 1, 2021.

International Search Report, issued in PCT/JP2019/015355, dated Jul. 9, 2019.

* cited by examiner

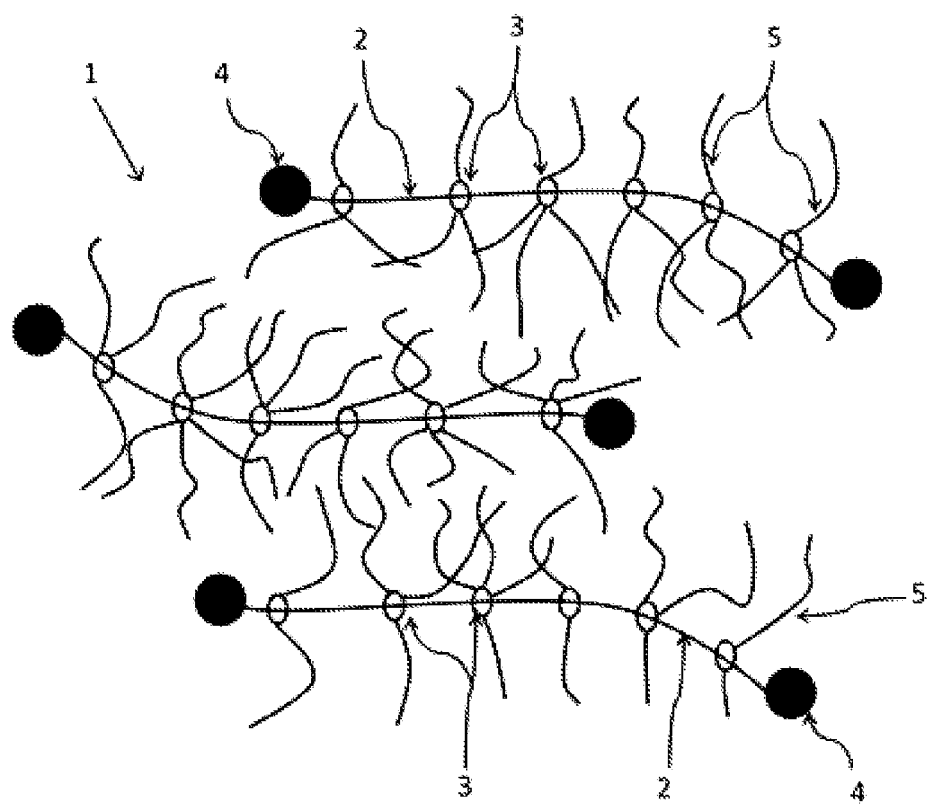

URETHANE RESIN USING POLYROTAXANE, AND PAD FOR POLISHING

TECHNICAL FIELD

The present invention relates to a novel urethane resin. Specifically, the present invention relates to a novel urethane resin obtained through polymerization of specified polymerizable monomer components and to a novel polishing pad made of the foregoing urethane resin.

BACKGROUND ART

A polishing member is a material which is used to flatten a member to be polished with an abrasive. Specifically, the polishing member is caused to slide over the surface of a member to be polished with continuous contact on the surface while an abrasive, such as a slurry is supplied onto the surface so as to flatten the surface of the member. For example, it includes a polishing pad.

A polyurethane resin is often used in such a polishing member. In general, as the polishing member, a material having favorable abrasion resistance and high durability for a long time is always desired from the viewpoint of cost reduction, stable production, and improvement of productivity.

Specifically the polishing member is used as a pad material (hereinafter occasionally referred to as "polishing pad") in a CMP (chemical mechanical polishing) method. The CMP method is a polishing method which provides excellent surface flatness and is adopted especially in production processes for a liquid crystal display (LCD), a glass substrate for hard disk, a silicon wafer, and a semiconductor device.

In the aforementioned CMP method, typically, there is generally adopted a method in which a slurry (polishing liquid) prepared by dispersing abrasive grains in an alkali solution or acid solution is supplied to undergo polishing at the time of polishing. That is, an object to be polished is flattened by a mechanical action of the abrasive grains contained in the slurry and a chemical action of the alkali solution or acid solution. Typically the slurry is supplied onto the surface of the object to be polished, and a polishing pad material is brought into contact with the surface while sliding over the surface to flatten the surface of the object to be polished.

As polishing characteristics of the polishing pad in the aforementioned CMP method, the polishing pad is required to be excellent in flatness of the object to be polished and to have a high polishing rate (polishing speed). Furthermore, an improvement of the abrasion resistance is desired in order to improve the productivity.

As the material of such a polishing pad, there is known a polishing material obtained from a urethane curable composition composed of a main agent containing a urethane prepolymer obtained by reacting a polyol with a polyisocyanate, such as toluene diisocyanate, and a curing agent containing an amine compound (see PTL 1). Furthermore, there is known a polishing material using p-phenylene diisocyanate as a polyisocyanate compound as a material capable of more improving the abrasion resistance (see PTL 2).

However, the polishing materials described in these methods have room for improvement so as to meet the recent requirement for high abrasion resistance because the polyol compound is a diol compound, and there is no crosslinked structure in the obtained urethane resin.

Meanwhile, the development of a polyrotaxane as a polymer having a novel structure is now under way. This polyrotaxane is a functional material having a composite molecular structure formed by an axial molecule and a plurality of cyclic molecules clathrating the axial molecule. Specific development examples thereof include a polyrotaxane which is used in an abrasion part and becomes a member having excellent slidability (see, for example PTL 3).

However, though it may be considered that a material containing the polyrotaxane described in PTL 3 is aimed to be used mainly for sport goods, construction materials, or medical materials, it has room for improvement so as to meet the requirement for high abrasion resistance.

Besides, the following resins using a polyrotaxane are now under study. For example, there is known a thermoplastic resin containing a polyrotaxane and a thermoplastic polyurethane (see PTL 4). In the thermoplastic resin described in this PTL 4, the mechanical characteristics of the thermoplastic polyurethane resin are improved due to the fact that it contains a polyrotaxane. However, the polyrotaxane and the thermoplastic polyurethane are merely mixed together, and therefore, there is also room for improvement so as to meet the requirement for high abrasion resistance.

In contrast to this, the improvement of the mechanical characteristics of a polyurethane is being made by introducing a polyrotaxane itself into the molecule of the polyurethane (see, for example, PTLs 5 to 9).

CITATION LIST

Patent Literature

PTL 1: JP 2007-77207 A
PTL 2: JP 2015-178558 A
PTL 3: WO 2006/115255 A
PTL 4: WO 2016/114243 A
PTL 5: WO 2015/159875 A
PTL 6: JP 2017-48305 A
PTL 7: JP 2017-75301 A
PTL 8: WO 2015/174187 A
PTL 9: WO 2017/130998 A

SUMMARY OF INVENTION

Technical Problem

The mechanical characteristics of the polyurethanes described in PTLs 5 to 9 can be more effectively improved. However, according to the study made by the present inventors, the development of a urethane resin having much higher abrasion resistance than the polyurethanes specifically shown in the working examples and so on described in PTLs 5 to 9 has been recently desired. At this point, in the conventional technologies, it has been noted that there is room for improvement. In addition, for use in polishing pads, for example, a urethane resin which does not produce a fine flaw, that is, has high scratch resistance and a high polishing rate and can produce smooth wafers stably is desired when a semiconductor material, such as a wafer, is polished. Therefore, a polishing pad which has appropriate hardness and excellent scratch resistance and is excellent in elastic recovery with a low hysteresis loss to enable one to achieve stable polishing at a high polishing rate in addition to excellent abrasion resistance is desired.

In consequence, an object of the present invention is to provide a urethane resin which has high abrasion resistance and excellent elastic recovery and is used as a sliding member with a low hysteresis loss. In particular, an object of the present invention is to provide a urethane resin which can be suitably used as a polishing pad.

Solution to Problem

In order to solve the aforementioned problem, the present inventors made extensive and intensive investigations to make the most of characteristic of the polyrotaxane. As a result, it has been found that a urethane resin obtained when on the occasion of reacting a polyrotaxane having a specified structure, especially modified cyclic molecules with a polyisocyanate compound (on the occasion of performing polymerization), a polyfunctional active hydrogen-containing compound having three or more groups having active hydrogen in a molecule thereof is further reacted exhibits an excellent effect while making most of characteristics of the polyrotaxane, thereby leading to accomplishment of the present invention.

Specifically, the present invention is concerned with the following.

(1) A urethane resin obtained by reacting a polymerizable composition containing at least
a urethane prepolymer (B2) having an iso(thio)cyanate group at an end of a molecule thereof, which is obtained by reacting a bifunctional active hydrogen-containing compound (C1) having two groups having active hydrogen in a molecule thereof and a bifunctional iso(thio)cyanate group-containing compound (B1) having two iso(thio)cyanate groups in a molecule thereof
a polyrotaxane (A) having a composite molecular structure formed by an axial molecule and a plurality of cyclic molecules clathrating the axial molecule, in which side chains having a group having active hydrogen are introduced into at least a part of the cyclic molecules, and
a polyfunctional active hydrogen-containing compound (C2) other than the polyrotaxane (A) and having three or more groups having active hydrogen in a molecule thereof.

In the present invention, the polyrotaxane (A) is a molecular complex having a structure in which a chain axial molecule passes through the inside of each of the rings of a plurality of cyclic molecules, a bulky group is bonded to both ends of the axial molecule, and the cyclic molecules cannot be removed from the axial molecule due to steric hindrance. The molecular complex like the polyrotaxane is called "supramolecule".

The polymerizable composition of the present invention can take the following modes.

(2) The urethane resin in the above (1), wherein the polyfunctional active hydrogen-containing compound (C2) contains a compound in which the group having active hydrogen is a hydroxy group or a thiol group, and a number average molecular weight is 90 to 1,000.

(3) The urethane resin in the above (1) or (2), wherein an iso(thio)cyanate equivalent of the urethane prepolymer (B2) is 300 to 5,000.

(4) The urethane resin in any of the above (1) to (3), wherein the polymerizable composition contains 50 to 2.000 parts by mass of the urethane prepolymer (B2) and 2 to 200 parts by mass of the polyfunctional active hydrogen-containing compound (C2) based on 100 parts by mass of the polyrotaxane (A).

In the polyrotaxane (A) as mentioned in detail later, the total number of moles of the "groups having active hydrogen" capable of reacting with the iso(thio)cyanate group, namely the "group having active hydrogen" which the side chains have, is defined as ns2.

(5) The urethane resin as set forth in any of the above (1) to (4), which is obtained by reacting the urethane prepolymer (B2), the polyrotaxane (A), and the polyfunctional active hydrogen-containing compound (C2), and further a bifunctional active hydrogen-containing compound (CH) having two groups having active hydrogen selected from a hydroxy group and a thiol group in a molecule thereof.

(6) The urethane resin in the above (5), wherein the polymerizable composition contains 50 to 2,000 parts by mass of the urethane prepolymer (B2), 2 to 200 parts by mass of the polyfunctional active hydrogen-containing compound (C2), and 3 to 200 parts by mass of the bifunctional active hydrogen-containing compound (CH) based on 100 parts by mass of the polyrotaxane (A).

(7) The urethane resin in any of the above (1) to (6), wherein the polymerizable composition further contains an amino group-containing compound (CA) other than the polyrotaxane (A) and the polyfunctional active hydrogen-containing compound (C2) and having at least one amino group in a molecule thereof with the total number of groups having active hydrogen being two or more.

(8) The urethane resin in the above (7), wherein the polymerizable composition contains 50 to 2,000 parts by mass of the urethane prepolymer (B2), 2 to 200 parts by mass of the polyfunctional active hydrogen-containing compound (C2), and 5 to 200 parts by mass of the amino group-containing compound (CA) based on 100 parts by mass of the polyrotaxane (A).

(9) The urethane resin in the above (7), wherein the polymerizable composition contains 50 to 2,000 parts by mass of the urethane prepolymer (B2), 2 to 200 parts by mass of the polyfunctional active hydrogen-containing compound (C2), 3 to 200 parts by mass of the bifunctional active hydrogen-containing compound (CH), and 3 to 200 parts by mass of the amino group-containing compound (CA) based on 100 parts by mass of the polyrotaxane (A).

(10) The urethane resin in any of the above (7) to (9), wherein the amino group-containing compound (CA) contains a compound having a number average molecular weight of 60 to 1,000.

(11) The urethane resin in any of the above (1) to (10), wherein the polymerizable composition further contains hollow particles.

(12) The urethane resin in the above (11), wherein the polymerizable composition contains 0.5 to 50 parts by mass of the hollow particles based on 100 parts by mass of the polyrotaxane (A).

(13) The urethane resin in the above (11) or (12), wherein the hollow particles are composed of a urethane-based resin.

(14) A polishing pad composed of the urethane resin in any of the above (1) to (13).

Advantageous Effects of Invention

By using the urethane resin of the present invention, there are revealed suitable hardness, excellent elastic recovery (low hysteresis loss), and high abrasion resistance as shown in the section of Examples as mentioned later. Therefore, in the case where the urethane resin is used as a sliding member (polishing material), for example, a polishing pad, it can develop not only high abrasion resistance but also excellent polishing properties, that is, high polishing rate, low scratching property, and high flatness.

BRIEF DESCRIPTION OF DRAWINGS

FIG. 1 is an image diagram of a polyrotaxane (A) which is used in the present invention.

DESCRIPTION OF EMBODIMENTS

The urethane resin of the present invention is a urethane resin obtained by reacting a polymerizable composition containing at least a urethane prepolymer (B2) having an iso(thio)cyanate group at an end of a molecule thereof, which is obtained by reacting a bifunctional active hydrogen-containing compound (C1) having two groups having active hydrogen in a molecule thereof and a bifunctional iso(thio)cyanate group-containing compound (B1) having two iso(thio)cyanate groups in a molecule thereof, a polyrotaxane (A) having a composite molecular structure formed by an axial molecule and a plurality of cyclic molecules clathrating the axial molecule, in which side chains having a group having active hydrogen are introduced into at least a part of the cyclic molecules, and a polyfunctional active hydrogen-containing compound (C2) other than the polyrotaxane (A) and having three or more groups having active hydrogen in a molecule thereof. That is, the urethane resin of the present invention is a thermosetting urethane resin into which the polyrotaxane (A) has been introduced into a molecule thereof.

A description is first given of the polyrotaxane (A) (hereinafter occasionally referred to simply as "polyrotaxane (A)" or "component (A)") having a composite molecular structure formed by an axial molecule and a plurality of cyclic molecules clathrating the axial molecule and side chains having a group having active hydrogen introduced into at least a part of the cyclic molecules.

<(A) Polyrotaxane Having a Composite Molecular Structure Formed by an Axial Molecule and a Plurality of Cyclic Molecules Clathrating the Axial Molecule and Side Chains Having a Group Having Active Hydrogen Introduced into at Least a Part of the Cyclic Molecules>

The polyrotaxane (A) which is used in the present invention is represented by "1" as a whole and has a composite molecular structure formed by a chain axial molecule "2", cyclic molecules "3" and side chains "5" as shown in FIG. 1. That is, a plurality of the cyclic molecules "3" clathrate the chain axial molecule "2", and the axial molecule "2" passes through the inside of each of the rings of the cyclic molecules "3". In consequence, the cyclic molecules "3" can freely slide over the axial molecule "2", but a bulky terminal group "4" is formed at both ends of the axial molecule "2", to prevent the cyclic molecules "3" from falling off from the axial molecule "2". Furthermore, the side chains "5" having a group having active hydrogen are introduced into the rings of the cyclic molecules "3".

In the polyrotaxane (A), the cyclic molecule "3" is slidable over the axial molecule "2". In addition, the side chains having a group having active hydrogen are introduced from the cyclic molecules "3", thereby making it possible to form a crosslinked structure or a pseudo-crosslinked structure by reacting with the urethane prepolymer (B2) having an iso(thio)cyanate group at an end of a molecule thereof as mentioned in detail later. As a result, it may be assumed that the abrasion resistance of the urethane resin is improved because the urethane resin has crosslinking points which facilitate molecular motion. Furthermore, it may be considered that the urethane resin has a low hysteresis loss and can develop excellent mechanical characteristics because it has the aforementioned slidable crosslinked structure in the molecule.

The polyrotaxane (A) can be synthesized by a method described in WO 2015/068798 A. The constitution of the component (A) is hereunder descried.

(Polyrotaxane (A): Axial Molecule)

In the polyrotaxane (A), various axial molecules are known. The chain part may be linear or branched so long as it can pass through the rings which the cyclic molecules have, and it is generally formed from a polymer. Specifically, it is described in WO 2015/068798 A.

Examples of the polymer which is suitable for forming such an axial molecule include polyethylene glycol, polyisoprene, polyisobutylene, polybutadiene, polypropylene glycol, polytetrahydrofuran, polydimethylsiloxane, polyethylene, polypropylene, polyvinyl alcohol, and polyvinyl methyl ether. Of these, polyethylene glycol is especially preferred.

Furthermore, though the bulky group which is formed at the both ends of the axial molecule is not particularly limited so long as it is a group capable of preventing the cyclic molecules from falling off from the axial molecule, examples thereof include an adamantyl group, a trityl group, a fluoresceinyl group, a dinitrophenyl group, and a pyrenyl group from the viewpoint of bulkiness. Of these, an adamantyl group is preferred especially from the standpoint of easiness of introduction.

Although the molecular weight of the axial molecule is not particularly limited, when it is too high, the viscosity tends to become high, whereas when it is too low, the mobility of the cyclic molecules tends to become low. From this viewpoint, a weight average molecular weight Mw of the axial molecule is in a range of preferably 400 to 100,000, more preferably 500 to 50,000, and especially preferably 800 to 30.000.

(Polyrotaxane (A): Cyclic Molecule)

The cyclic molecules are one having a ring large enough to clathrate the aforementioned axial molecule. Examples of such a ring include a cyclodextrin ring, a crown ether ring, a benzo-crown ring, a dibenzo-crown ring, and a dicyclohexano-crown ring. Of these, a cyclodextrin ring is especially preferred.

The cyclodextrin ring includes an α-form (ring inner diameter: 0.45 to 0.6 nm), a β-form (ring inner diameter: 0.6 to 0.8 nm), and a γ-form (ring inner diameter: 0.8 to 0.95 nm). In particular, an α-cyclodextrin ring and a 6-cyclodextrin ring are most preferred.

In the cyclic molecule having the aforementioned ring, one or more cyclic molecules clathrate one axial molecule. When the maximum clathrating number of cyclic molecules capable of clathrating one axial molecule is defined as 1, the clathrating number of cyclic molecules is preferably 0.8 or less at maximum. When the clathrating number of cyclic molecules is too large, the cyclic molecules are densely present in one axial molecule. As a result, the mobility (slide width) is lowered, the mechanical characteristics tend to become low, and an effect for exhibiting uniform hydrophilicity in the cured body tends to become low. In addition to the above, the molecular weight of the polyrotaxane (A) itself increases. Therefore, when used for a curable composition, handling properties of the curable composition tend to become low. Furthermore, molding failure of the obtained cured body tends to be readily revealed. In the light of the above, more preferably, at least two or more cyclic molecules clathrate one axial molecule. The clathrating number of cyclic molecules is preferably in a range of 0.6 or less at maximum, and more preferably in a range of 0.5 or less at maximum. In the case of setting a specific lower limit value, in general, when the maximum clathrating number of cyclic molecules capable of clathrating one axial molecule is defined as 1, the clathrating number of cyclic molecules is in a range of preferably 0.001 to 0.8, more preferably 0.001 to 0.6, still more preferably 0.002 to 0.5, and especially preferably 0.01 to 0.4.

The maximum clathrating number of cyclic molecules relative to one axial molecule can be calculated from a length of the axial molecule and a thickness of each of the rings which the cyclic molecules have. For example, when the case where the chain part of the axial molecule is formed from polyethylene glycol, and the ring which the cyclic molecule has is an α-cyclodextrin ring is taken as an example, the maximum clathrating number is calculated as follows.

That is, two recurring units [—$CH_2$—$CH_2$O—] of polyethylene glycol approximate the thickness of one α-cyclodextrin ring. In consequence, the number of the recurring units is calculated from the molecular weight of this polyethylene glycol, whereby ½ of the number of the recurring units is determined as the maximum clathrating number of cyclic molecules. Based on the condition that the maximum clathrating number of cyclic molecules is 1.0, the number of clathrating cyclic molecules is adjusted to the aforementioned range.

(Polyrotaxane (A): Side Chains which the Cyclic Molecules have)

The polyrotaxane (A) which is used in the present invention is characterized in that side chains are introduced into the cyclic molecules and have a group having active hydrogen. In the present invention, the side chain which the aforementioned cyclic molecule has a certain length. The active hydrogen which the cyclic molecule has directly is not corresponding to the active hydrogen which the side chain has. That is, for example, in the case where the cyclic molecule is an α-cyclodextrin ring, the active hydrogen of a hydroxy group (OH group) which the α-cyclodextrin ring has is not corresponding to the active hydrogen which the side chain has.

In the present invention, all of "number of moles of groups having active hydrogen" which the polyrotaxane (A) has are defined as n2. This n2 is corresponding to the total number of moles of the groups having active hydrogen which the side chains have and the groups having active hydrogen which the cyclic molecules have directly ("number of moles of all the groups having active hydrogen").

Meanwhile, in the present invention, the total number of moles of the groups having active hydrogen which the side chains have is defined as ns2. As for a manner for determining ns2, it can be calculated through analysis of side chains introduced by means of NMR (nuclear magnetic resonance) or the like. In addition, in the case where the group having active hydrogen is a hydroxy group, it can be calculated as the "group having active hydrogen" which the side chain has by measuring a hydroxyl number. This is because after the side chains are introduced into the cyclic molecules, the hydroxy group with low reactivity, which remains in the cyclic molecules, is hardly measured as the hydroxyl number. It should be construed that the group having active hydrogen which the cyclic molecules of the polyrotaxane (A) have directly is not included.

In the present invention, it may be considered that when side chains having a certain length have active hydrogen, an excellent effect is obtained. That is, the "active hydrogen (group having active hydrogen)" which the cyclic molecules have directly is low in reactivity. Therefore, it may be considered that when the side chains have "active hydrogen (group having active hydrogen)", the polyrotaxane (A) is uniformly introduced into the urethane resin, thereby exhibiting an excellent effect.

As mentioned later, in the present invention, for example, when the cyclic molecule is an α-cyclodextrin ring, it is preferred that a hydroxy group (OH group) which the α-cyclodextrin ring has is reacted with another compound to form a ring having side chains from the another compound, thereby introducing active hydrogen into the side chains.

As the group having active hydrogen which the side chain has, there is exemplified at least one group selected from a hydroxy group (OH group), a thiol group (SH group), and an amino group (—$NH_2$, or —NHR; R is a substituent, such as an alkyl group). Of these, the OH group is preferred from the standpoint of favorable reactivity with the urethane prepolymer (B2) having the iso(thio)cyanate group at the end of the molecule of the present invention.

Although the side chain having a group having active hydrogen is not particularly limited, it is preferably formed from repetition of an organic chain having 3 to 20 carbon atoms. An average molecular weight of such a side chain is preferably in a range of 45 to 10,000. In addition, the average molecular weight of the side chain is preferably 50 to 10,000, more preferably 55 to 8,000, and still more preferably 100 to 8.000. Furthermore, in order to more enhance the effect of the obtained urethane resin, the average molecular weight of the side chain is preferably 100 to 5,000, more preferably 200 to 5,000, still more preferably 200 to 1.500, and especially preferably 300 to 1.500. The average molecular weight of the side chain can be adjusted by the amount of the compound used at the time of introducing the side chain and can be obtained by calculation, and it can also be determined by $^1$H-NMR measurement. When the side chain is too short, the uniform flattening accuracy of the surface of the object to be polished tends to lower. On the other hand, when the side chain is too long, the abrasion resistance tends to lower.

The aforementioned side chain is introduced by making use of the active hydrogen which the cyclic molecule has and modifying this group having active hydrogen. For example, the α-cyclodextrin ring has 18 OH groups (hydroxy groups) as the group having active hydrogen, and the side chain is introduced through this OH group. That is, the 18 side chains at maximum can be introduced into one α-cyclodextrin ring. In the present invention, in order to fully exhibit the function of the aforementioned side chain, it is preferred that 4.% or more, preferably 6% or more, more preferably 15% or more, and still more preferably 30% or more of the total number of groups having active hydrogen which such a ring has is modified by the side chain.

The group having active hydrogen which the cyclic molecule has occasionally affects compatibility with another component. In particular, when the group having active hydrogen is an OH group, it has a large effect on compatibility with another component. Therefore, a modification ratio (modification degree) of the group having active hydrogen is preferably 4% or more and 80% or less, more preferably 6% or more and 80% or less, still more preferably 15% or more and 70% or less, and especially preferably 30% or more 70% or less.

As mentioned in detail later, since the group having active hydrogen which the cyclic molecule has is lower in reactivity than the group having active hydrogen which the side chain has (for example, the OH group), the deterioration of compatibility and a bleed-out problem hardly occur even when the modification degree is low. Therefore, when the modification degree falls within the aforementioned range, a more excellent effect is exhibited. In the case where the side chain is bonded to 9 out of the 18 hydroxy groups of the aforementioned α-cyclodextrin ring, the modification degree is 50%.

When the aforementioned side chain (organic chain) is one having the group having active hydrogen in an organic chain thereof, it may be linear or branched. In addition, a desired side chain can be introduced by reacting the organic chain (side chain) having a group having active hydrogen with the functional groups of the cyclic molecule by making use of living radical polymerization, such as ring-opening polymerization, radical polymerization, cationic polymerization, anionic polymerization, atom transfer radical polymerization, RAFT polymerization, and NMP polymerization.

For example, a side chain derived from a cyclic compound, such as a lactone compound and a cyclic ether, can be introduced through ring-opening polymerization. An OH group is introduced as the group having active hydrogen into the end of a side chain which is introduced through the ring-opening polymerization of a cyclic compound, such as a lactone compound and a cyclic ether.

Of the cyclic compounds, a cyclic ether or a lactone compound is preferably used from the viewpoint of easiness of availability, high reactivity, and easy control of size (molecular weight). Specific examples of the suitable cyclic compound are as follows.

Cyclic Ether:

Ethylene oxide, 1,2-propylene oxide, epichlorohydrin, epibromohydrin, 1,2-butylene oxide, 2,3-butylene oxide, isobutylene oxide, oxetane, 3-methyloxetane, 3,3-dimethyloxetane, tetrahydrofuran, 2-methyltetrahydrofuran, and 3-methyltetrahydrofuran Lactone Compound:

4-Membered cyclic lactones, such as β-propiolactone, β-methylpropiolactone, and L-serine-β-lactone 5-Membered cyclic lactones, such as γ-butyrolactone, γ-hexanolactone, γ-heptanolactone, γ-octanolactone, γ-decanolactone, γ-dodecanolactone, α-hexyl-γ-butyrolactone, α-heptyl-γ-butyrolactone, α-hydroxy-γ-butyrolactone, γ-methyl-γ-decanolactone, α-methylene-γ-butyrolactone, α,α-dimethyl-γ-butyrolactone, D-erythronolactone, α-methyl-γ-butyrolactone, γ-nonanolactone, DL-pantolactone, γ-phenyl-γ-butyrolactone, γ-undecanolactone, γ-valerolactone, 2,2-pentamethylene-1,3-dioxolan-4-one, α-bromo-γ-butyrolactone, γ-crotonolactone, α-methylene-γ-butyrolactone, α-methacryloyloxy-γ-butyrolactone, and β-methacryloyloxy-γ-butyrolactone 6-Membered cyclic lactones, such as δ-valerolactone, δ-hexanolactone, δ-octanolactone, δ-nonanolactone, δ-decanolactone, δ-undecanolactone, δ-dodecanolactone, δ-tridecanolactone, δ-tetradecanolactone, DL-mevalonolactone, δ-lactone 4-hydroxy-1-cyclohexane carboxylate, monom-ethyl-δ-valerolactone, monoethyl-δ-valerolactone, monohexyl-δ-valerolactone, 1,4-dioxan-2-one, and 1,5-dioxepan-2-one 7-Membered cyclic lactones, such as non-alkyl-ε-caprolactone, dialkyl-ε-caprolactone, monomethyl-ε-caprolactone, monoethyl-ε-caprolactone, monohexyl-ε-caprolactone, dimethyl-ε-caprolactone, di-n-propyl-ε-caprolactone, di-n-hexyl-ε-caprolactone, trimethyl-ε-caprolactone, triethyl-ε-caprolactone, tri-n-ε-caprolactone, ε-caprolactone, 5-nonyl-oxepan-2-one, 4,4,6-trimethyl-oxepan-2-one, 4,6,6-trimethyl-oxepan-2-one, and 5-hydroxymethyl-oxepan-2-one 8-Membered Cyclic Lactones, Such as ξ-Enantholactone Other lactones, such as lactone lactide, dilactide, tetramethyl glycoside, 1,5-dioxepan-2-one, and t-butyl caprolactone The aforementioned cyclic compounds can be used alone or can also be used in combination of plural kinds thereof.

In the present invention, the side chain introducing compound which is suitably used is a lactone compound, lactone compounds, such as ε-caprolactone, α-acetyl-γ-butyrolactone, α-methyl-γ-butyrolactone, γ-valerolactone, and γ-butyrolactone are especially preferred, and ε-caprolactone is most preferred.

In the case where the side chain is introduced by reacting the cyclic compound through ring-opening polymerization, the group having active hydrogen (for example, a hydroxy group) bonded to the ring has poor reactivity so that there is a case where it is difficult to directly react a large molecule due to steric hindrance or the like. In this case, for example, in order to react caprolactone or the like, there can be adopted means for introducing a large side chain through the ring-opening polymerization of the caprolactone with the hydroxy group of a hydroxypropyl group after a low-molecular weight compound, such as propylene oxide, is reacted with the group having active hydrogen to undergo hydroxypropylation so as to introduce a highly reactive functional group (hydroxy group). In this case, the hydroxypropylated part can also be considered as the side chain.

In the polyrotaxane (A) which is used in the present invention, in the case of introducing a side chain having an OH group (hydroxy group) into the cyclic molecule, when easiness of introduction of the side chain, easy control of size (molecular weight) of the side chain, modification of the OH group, and so on are taken into consideration, it is preferred to adopt a method for introducing the side chain through the aforementioned ring-opening polymerization. Therefore, it is preferred that a side chain having an OH group at the end is introduced.

Besides, by introducing a side chain derived from a cyclic compound, such as a cyclic acetal, a cyclic amine, a cyclic carbonate, a cyclic imino ether, and a cyclic thiocarbonate through ring-opening polymerization, a side chain having active hydrogen can be introduced. Of these, as specific examples of the suitable cyclic compound, those described in WO 2015/068798A can be used.

The method for introducing the side chain into the cyclic molecule through radical polymerization is as follows.

The ring which the cyclic molecule of the polyrotaxane has does not have an active site serving as a radical starting point. Therefore, prior to the reaction of a radical polymerizable compound, a compound for forming the radical starting point must be reacted with a group having active hydrogen (OH group) which the ring has, to form the active site serving as the radical starting point.

As the compound for forming the radical starting point, an organic halogen compound is representative. Examples thereof include 2-bromoisobutyryl bromide, 2-bromobutyric acid, 2-bromopropionic acid, 2-chloropropionic acid, 2-bromoisobutyric acid, epichlorohydrin, epibromohydrin, and 2-chloroethyl isocyanate. That is, such an organic halogen compound is bonded to the ring through a condensation reaction with the group having active hydrogen which the cyclic molecule has, thereby introducing a group containing a halogen atom (an organic halogen compound residue) into the ring. A radical is produced in this organic halogen compound residue through movement of a halogen atom on the occasion of radical polymerization to become a radical polymerization starting point, from which the radical polymerization proceeds.

The group (organic halogen compound residue) having an active site serving as the aforementioned radical polymerization starting point can also be introduced by, for example, reacting a hydroxy group which the ring has with a compound having a functional group, such as an amine, a carboxylic acid, an isocyanate, an imidazole, and an acid anhydride, to introduce a functional group other than the hydroxy group and reacting such a functional group with the aforementioned organic halogen compound.

As the radical polymerizable compound which is used in order to introduce the side chain through radical polymerization, a compound having at least one group having an ethylenically unsaturated bond, for example, a functional group, such as a (meth)acrylic group, a vinyl group, and a styryl group (hereinafter referred to as "ethylenically unsaturated monomer") is suitably used. In addition, as the ethylenically unsaturated monomer, an oligomer or polymer having a terminal ethylenically unsaturated bond (hereinafter referred to as "macromonomer") can also be used. As for such an ethylenically unsaturated monomer, those described in WO 2015/068798 A can be used as specific examples of the suitable cyclic compound.

In the case where the side chain is introduced into the cyclic molecule by using the radical polymerizable compound, and the radical polymerizable compound has a group having active hydrogen, the side chain has a group having active hydrogen as it is. In addition, in the case where the radical polymerizable compound does not have a group having active hydrogen, after the side chain is formed by the radical polymerizable compound, a part of the side chain may be substituted by a group having active hydrogen.

(Suitable Constitution of Polyrotaxane (A))

In the present invention, the polyrotaxane (A) which is most suitably used is one in which it includes polyethylene glycol bonded to an adamantyl group at both ends as the axial molecule and cyclic molecules having an α-cyclodextrin ring as the cyclic molecules, and the side chains (having a terminal OH group) are introduced into the rings by polycaprolactone. After the hydroxypropylation of the OH groups of the α-cyclodextrin ring, polycaprolactone may be introduced through ring-opening polymerization.

The weight average molecular weight of the axial molecule, the clathrating number of the α-cyclodextrin ring, the modification ratio (modification degree) of the hydroxy group of the α-cyclodextrin ring, and the molecular weight of the side chain are preferably those as mentioned above. The side chain introduced may be a group having active hydrogen at all of ends, and in order to control the number of moles of active hydrogens to a desired number, the side chain can also be modified into a nonreactive group.

Next, the <urethane prepolymer (B2) having an iso(thio)cyanate group at an end of a molecule thereof> is described.

<Urethane Prepolymer (B2) Having an Iso(Thio)Cyanate Group at an End of a Molecule Thereof>

The urethane prepolymer (B2) having an iso(thio)cyanate group at an end of a molecule thereof (hereinafter occasionally referred to simply as "component (B2)" or "urethane prepolymer (B2)") is a urethane prepolymer (B2) having an iso(thio)cyanate group at an end of a molecule thereof, which is obtained by reacting a bifunctional active hydrogen-containing compound (C1) having two groups having active hydrogen in a molecule thereof (hereinafter occasionally referred to simply as "component (C1)" or "bifunctional active hydrogen-containing compound (C1)") and a bifunctional iso(thio)cyanate group-containing compound (B1) having two iso(thio)cyanate groups in a molecule thereof (hereinafter occasionally referred to simply as "component (B1)" or "bifunctional iso(thio)cyanate group-containing compound (B1)"). In the present invention, the iso(thio)cyanate group refers to an isocyanate group or an isothiocyanate group. Therefore, the wordings "having two iso(thio)cyanate groups in a molecule thereof" refer to the case of having two isocyanate groups, the case of having two isothiocyanate groups, or the case of having one isocyanate group and one isothiocyanate group.

The urethane prepolymer (B2) may contain an unreacted isocyanate group, and those which are generally used can be used without any limitations. First of all, the component (B1) serving as the raw material is described.

<Component (B1): Bifunctional Iso(Thio)Cyanate Group-Containing Compound>

The bifunctional iso(thio)cyanate group-containing compound (B1) can be, for example, roughly classified into an aliphatic isocyanate, an alicyclic isocyanate, an aromatic isocyanate, and an isothiocyanate compound. In the present invention, the bifunctional iso(thio)cyanate group-containing compound (B1) can be used alone or can also be used in combination of plural kinds thereof. In the case where a plurality of the compounds are used, the basic mass amount of the component (B1) is the total amount of these plural compounds. Specifically, examples of the bifunctional iso(thio)cyanate compound (B1) include the following compounds.

(Component (B1): Aliphatic Isocyanate)

Bifunctional isocyanate compounds, such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-trimethylundecamethylene diisocyanate, 1,3,6-trimethylhexamethylene diisocyanate, 1,8-diisocyanato-4-isocyanatomethyloctane, 2,5,7-trimethyl-1,8-diisocyanato-5-isocyanatomethyloctane, bis(isocyanatoethyl)carbonate, bis(isocyanatoethyl)ether, 1,4-butylene glycol dipropyl ether-ω,ω'-diisocyanate, lysine diisocyanatomethyl ester, and 2,4,4-trimethylhexamethylene diisocyanate (Component (B1): Alicyclic Isocyanate)

Isophorone diisocyanate, (bicyclo[2.2.1]heptane-2,5-diyl) bismethylene diisocyanate, (bicyclo[2.2.1]heptane-2,6-diyl) bismethylene diisocyanate, 2β,5α-bis(isocyanato)norbornane, 2β,5β-bis(isocyanato)norbornane, 2β,6α-bis(isocyanato)norbornane, 2β,6β-bis(isocyanato)norbornane, 2,6-di(isocyanatomethyl)furan, bis(isocyanatomethyl)cyclohexane, dicyclohexylmethane-4,4'-diisocyanate, 4,4-isopropylidenebis(cyclohexyl isocyanate), cyclohexane diisocyanate, methylcyclohexane diisocyanate, dicyclohexyl dimethylmethane diisocyanate, 2,2'-dimethyl dicyclohexylmethane diisocyanate, bis(4-isocyanato-n-butylidene)pentaerythritol, dimeric acid diisocyanate, 2,5-bis(isocyanatomethyl)-bicyclo[2.2.1]-heptane, 2,6-bis(isocyanatomethyl)-bicyclo[2.2.1]-heptane, 3,8-bis(isocyanatomethyl) tricyclodecane, 3,9-bis(isocyanatomethyl)tricyclodecane, 4,8-bis(isocyanatomethyl)tricyclodecane, 4,9-bis(isocyanatomethyl)tricyclodecane, 1,5-diisocyanate decalin, 2,7-diisocyanto decalin, 1,4-diisocyanate decalin, 2,6-diisocyanate decalin, bicyclo[4.3.0]nonane-3,7-diisocyanate, bicyclo[4.3.0]nonane-4,8-diisocyanate, bicyclo[2.2.1]heptane-2,5-diisocyanate, bicyclo[2.2.1]heptane-2,6-diisocyanate, bicyclo[2,2,2]octane-2,5-diisocyanate, bicyclo[2,2,2]octane-2,6-diisocyanate, tricyclo[5.2.1.0$^{2,6}$]decane-3,8-diisocyanate, and tricyclo[5.2.1.0$^{2,6}$]decane-4,9-diisocyanate (Component (B1): Aromatic Isocyanate)

Bifunctional isocyanate compounds, such as xylylene diisocyanate (o-, m-, p-), tetrachloro-m-xylylene diisocyanate, methylene diphenyl-4,4'-diisocyanate, 4-chloro-m-xylylene diisocyanate, 4,5-dichloro-m-xylylene diisocyanate, 2,3,5,6-tetrabromo-p-xylylene diisocyanate, 4-methyl-m-xylylene diisocyanate, 4-ethyl-m-xylylene diisocyanate, bis(isocyanatoethyl)benzene, bis(isocyanatopropyl)benzene, 1,3-bis($\alpha,\alpha$-dimethylisocyanatomethyl)benzene, 1,4-bis($\alpha,\alpha$-dimethylisocyanatomethyl)benzene, $\alpha,\alpha,\alpha',\alpha'$-tetramethylxylylene diisocyanate, bis(isocyanatobutyl)benzene, bis(isocyanatomethyl)naphthalene, bis(isocyanatomethyl)diphenyl ether, bis(isocyanatoethyl)phthalate, 2,6-di(isocyanatomethyl)furan, phenylene diisocyanate (o-, m-, p-), tolylene diisocyanate, ethyl phenylene diisocyanate, isopropyl phenylene diisocyanate, dimethyl phenylene diisocyanate, diethyl phenylene diisocyanate, diisopropyl phenylene diisocyanate, trimethylbenzene triisocyanate, benzene triisocyanate, 1,3,5-triisocyanatomethyl benzene, 1,5-naphthalene diisocyanate, methyl naphthalene diisocyanate, biphenyl diisocyanate, 2,4-tolylene diisocyanate, 2,6-tolylene diisocyanate, 4,4'-diphenylmethane diisocyanate, 2,2'-diphenylmethane diisocyanate, 2,4'-diphenylmethane diisocyanate, 3,3'-dimethyldiphenylmethane-4,4'-diisocyanate, bibenzyl-4,4'-diisocyanate, bis(isocyanatophenyl)ethylene, 3,3'-dimethoxybiphenyl-4,4'-diisocyanate, phenyl isocyanatomethyl isocyanate, phenyl isocyanatoethyl isocyanate, tetrahydronaphthylene diisocyanate, hexahydrobenzene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethyl carbazole diisocyanate, dichlorocarbazole diisocyanate 2,4-tolylene diisocyanate, and 2,6-tolylene diisocyanate (Component (B1): Isothiocyanate Compound)

Examples of compounds having an alkylene chain include hexamethylene diisothiocyanate, 1,2-diisothiocyanatoethane, 1,3-diisothiocyanatopropane, 1,4-diisothinatobutane, 1,6-diisothiocyanatohexane, 2,4,4-trimethylhexane diisothiocyanate, thiobis(3-isothiocyanatopropane), thiobis(2-isothiocyanatoethane), and dithiobis(2-isothiocyanatoethane).

Examples of compounds having a phenyl group or a cyclohexane group (ring) include p-phenylene diisopropylidene diisothiocyanate, 1,2-diisothiocyanatobenzene, 1,3-diisothiocyanatobenzene, 1,4-diisothiocyanatobenzene, 2,4-diisothiocyanatotoluene, isophorone diisothiocyanate, xylene diisothiocyanate (o-, m-, p-), 2,4-tolylene diisothiocyanate, 2,6-tolylene diisothiocyanate, and cyclohexane diisothiocyanate.

Examples of compounds having two phenyl groups or two cyclohexane groups (rings) include 1,1'-methylenebis(4-isothiocyanatobenzene), 1,1'-methylenebis(4-isothiocyanato-2-methylbenzene), and 1,1'-methylenebis(4-isothiocyanato-3-methylbenzene).

Examples of compounds having a norbornane ring include 2,4-bis(isothiocyanatomethyl)norbornane, 2,5-bis(isothiocyanatomethyl)norbornane, 2,6-bis(isothiocyanatomethyl)norbornane, 3,5-bis(isothiocyanatomethyl)norbornane, and norbornane diisocyanate.

Examples of compounds having a thiophene ring or a sulfur-containing heterocyclic ring include thiophene-2,5-diisocyanate, 1,4-dicyane-2,5-diisothiocyanate, 2,5-bis(isothiocyanatomethyl)-1,4-dithiane, and 4,5-bis(isothiocyanatomethyl)-1,3-dithiolane.

<Component (B1): Suitable Bifunctional Iso(Thio)Cyanate Group-Containing Compound>

Of the foregoing bifunctional iso(thio)cyanate group-containing compounds (B1), the compound which is suitable for forming the component (B2) of the present invention is not particularly limited. However, as the bifunctional iso(thio)cyanate group-containing compound (B1), in particular, the following exemplified compounds are preferably used. Specifically, it is preferred to use xylene diisocyanate (o-, m-, p-), 2,4-tolylene diisocyanate, 2,6-tolylene diisocyanate, phenylene diisocyanate (o-, m-, p-), 2,2'-diphenylmethane diisocyanate, 2,4'-diphenylmethane diisocyanate, 4,4'-diphenylmethane diisocyanate, or 1,5-naphthalenediisocyanate.

Next, the bifunctional active hydrogen-containing compound (C1) having two groups having active hydrogen in a molecule thereof (component (C1)) is described.

<Component (C1): Bifunctional Active Hydrogen-Containing Compound (C1) Having Two Groups Having Active Hydrogen in a Molecule Thereof>

As the bifunctional active hydrogen-containing compound (C1), a compound having two groups having active hydrogen in a molecule thereof can be used without being particularly limited. In the component (C1) of the present invention, examples of the suitable group having active hydrogen include the same groups as those described in the section of the (side chain which the cyclic molecules of the polyrotaxane (A) have). Above all, from the standpoint of controlling the reaction on production of the urethane prepolymer (component (A)) and the viewpoint of viscosity of the obtained urethane prepolymer at least one group selected from a hydroxy group and a thiol group is preferred.

The component (C) may have two kinds of groups having active hydrogen in one molecule (for example, it may have each one of a hydroxy group and a thiol group). Furthermore, as for the component (C1), plural kinds of compounds can be used. In the case where a plurality of the compounds are used, the basic mass amount thereof is the total amount of these plural compounds. Examples of the aforementioned (C1) include those mentioned below.

(Component (C1): Compound Having OH Group)

Examples of the compound having an OH group include polyol compounds. As for the polyol compound, the polyol compound which is used for the component (C1) of the present invention is a compound containing two OH groups in one molecule.

Examples thereof include compounds having OH at both ends of an alkylene group having 2 to 10 carbon atoms, specifically dimethyl-, trimethyl-, tetramethyl-, pentamethyl-, and hexamethyl-dihydroxy compounds. Besides, representative examples thereof include a polyester containing two OH groups in one molecule (polyester polyol), a polyether containing two OH groups in one molecule (hereinafter also referred to as "polyether polyol"), a polycarbonate containing two OH groups in one molecule (polycarbonate polyol), a polycaprolactone containing two OH groups in one molecule (polycaprolactone polyol), and an acrylic polymer containing two OH groups in one molecule (polyacrylic polyol).

These polyol compounds may contain a prepolymer prepared through a reaction with the aforementioned bifunctional iso(thio)cyanate compound (B1). In the aforementioned bifunctional active hydrogen-containing compound (C1), examples of the prepolymer of the polyol compound include known compounds having an unreacted OH group at both ends.

Specific examples of such a compound are as follows.
(Component (C1): Aliphatic Alcohol)

Bifunctional active hydrogen-containing compounds, such as ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, neopentyl glycol, glyceryl monooleate, monoelaidin, polyethylene glycol, 3-methyl-1,5-dihydroxypentane, 2-ethyl-1,2-dihydroxyhexane, 2-methyl-1,3-dihydroxypropane, and polytetramethylene glycol
(Component (C1): Alicyclic Alcohol)

Bifunctional active hydrogen-containing compounds, such as hydrogenated bisphenol A, cyclobutanediol, cyclopentanediol, cyclohexanediol, cycloheptanediol, cyclooctanediol, cyclohexanedimethanol, hydroxypropyl cyclohexanol, tricyclo[5,2,1,0$^{2.6}$]decane-dimethanol, bicyclo[4,3,0]-nonanediol, dicyclohexanediol, tricyclo[5,3,1,1$^{3.9}$] dodecanediol, bicyclo[4,3,0]nonanedimethanol, tricyclo[5,3,1,1$^{3.9}$]dodecane-diethanol, hydroxypropyl tricyclo[5,3,1,1$^{3.9}$]dodecanol, spiro[3.4]octanediol, butyl cyclohexanediol, 1,1'-bicyclohexylidene diol, 1,4-cyclohexane dimethanol, 1,3-cyclohexane dimethanol, 1,2-cyclohexane dimethanol, and o-dihydroxyxylylene
(Component (C1): Aromatic Alcohol)

Bifunctional active hydrogen-containing compounds, such as dihydroxynaphthalene, dihydroxybenzene, bisphenol A, bisphenol F, xylylene glycol, tetrabromobisphenol A, bis(4-hydroxyphenyl)methane, 1,1-bis(4-hydroxyphenyl) ethane, 1,2-bis(4-hydroxyphenylethane, bis(4-hydroxyphenyl)phenylmethane, bis(4-hydroxyphenyl)diphenylmethane, bis(4-hydroxyphenyl)-1-naphthylmethane, 1,1-bis(4-hydroxyphenyl)-1-phenylethane, 2-(4-hydroxyphenyl)-2-(3-hydroxyphenyl)propane, 2,2-bis(4-hydroxyphenyl) butane, 1,1-bis(4-hydroxyphenyl)butane, 2,2-bis(4-hydroxyphenyl)-3-methylbutane, 2,2-bis(4-hydroxyphenyl) pentane, 3,3-bis(4-hydroxyphenyl)pentane, 2,2-bis(4-hydroxyphenyl)hexane, 2,2-bis(4-hydroxyphenyl)octane, 2,2-bis(4-hydroxyphenyl)-4-methylpentane, 2,2-bis(4-hydroxyphenyl)heptane, 4,4-bis(4-hydroxyphenyl)heptane, 2,2-bis(4-hydroxyphenyl)tridecane, 2,2-bis(4-hydroxyphenyl)octane, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-tert-butyl-4-hydroxyphenyl)propane, 2,2-bis(3-cyclohexyl-4-hydroxyphenyl)propane, 2,2-bis(3-allyl-4'-hydroxyphenyl)propane, 2,2-bis(3-methoxy-4-hydroxyphenyl)propane, 2,2-bis(3,5-dimethyl-4-hydroxyphenyl)propane, 2,2-bis(2,3,5,6-tetramethyl-4-hydroxyphenyl) propane, bis(4-hydroxyphenyl)cyanomethane, 1-cyano-3,3-bis(4-hydroxyphenyl)butane, 2,2-bis(4-hydroxyphenyl) hexafluoropropane, 1,1-bis(4-hydroxyphenyl)cyclopentane, 1,1-bis(4-hydroxyphenyl)cyclohexane, 1,1-bis(4-hydroxyphenyl)cycloheptane, 1,1-bis(3-methyl-4-hydroxyphenyl) cyclohexane, 1,1-bis(3,5-dimethyl-4-hydroxyphenyl)cyclohexane, 1,1-bis(3,5-dichloro-4-hydroxyphenyl) cyclohexane, 1,1-bis(3-methyl-4-hydroxyphenyl)-4-methylcyclohexane, 1,1-bis(4-hydroxyphenyl)-3,3,5-trimethylcyclohexane, 2,2-bis(4-hydroxyphenyl) norbornane, 2,2-bis(4-hydroxyphenyl)adamantane, 4,4'-dihydroxydiphenyl ether, 4,4'-dihydroxy-3,3'-dimethyldiphenyl ether, ethylene glycol bis(4-hydroxyphenyl)ether, 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide, 4,4'-dihydroxydiphenyl sulfoxide, 3,3'-dimethyl-4,4'-dihydroxydiphenyl sulfoxide, 4,4'-dihydroxydiphenyl sulfone, 4,4'-dihydroxy-3,3'-dimethyldiphenyl sulfone, bis(4-hydroxyphenyl) ketone, bis(4-hydroxy-3-methylphenyl) ketone, 7,7'-dihydroxy-3,3',4,4'-tetrahydro-4,4,4',4'-tetramethyl-2,2'-spirobi(2H-1-benzopyran), trans-2,3-bis(4-hydroxyphenyl)-2-butene, 9,9-bis(4-hydroxyphenyl)fluorene, 3,3-bis(4-hydroxyphenyl)-2-butanone, 1,6-bis(4-hydroxyphenyl)-1,6-hexanedione, 4,4'-dihydroxybiphenyl, m-dihydroxyxylylene, p-dihydroxyxylylene, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, 1,4-bis(6-hydroxyhexyl)benzene, 2,2-bis[4-(2"-hydroxyethyloxy)phenyl] propane, hydroquinone, and resorcin
(Component (C1): Other High-Molecular Weight Polyol)

Polyester polyols: There are exemplified bifunctional active hydrogen-containing compounds having two hydroxy groups, which are obtained through a condensation reaction between a polyol and a polybasic acid. Above all, the number average molecular weight is preferably 400 to 2,000, more preferably 500 to 1,500, and most preferably 600 to 1,200.

Polyether polyols: There are exemplified compounds having two hydroxy groups, which are obtained through ring-opening polymerization of an alkylene oxide, or compounds obtained through a reaction between a compound having two active hydrogen-containing groups in a molecule thereof and an alkylene oxide, and modified products thereof. Above all, the number average molecular weight is preferably 400 to 2,000, more preferably 500 to 1,500, and most preferably 600 to 1,200.

Polycaprolactone polyols: There are exemplified compounds having two hydroxy groups, which are obtained through rig-opening polymerization of ε-caprolactone. Above all, the number average molecular weight is preferably 400 to 2,000, more preferably 500 to 1.500, and most preferably 600 to 1,200.

Polycarbonate polyols: There are exemplified compounds having two hydroxy groups, which are obtained through phosgenation of at least one low-molecular weight polyol, or compounds having two OH groups, which are obtained by transesterification using ethylene carbonate, diethyl carbonate, diphenyl carbonate, or the like. Above all, the number average molecular weight is preferably 400 to 2,000, more preferably 500 to 1,500, and most preferably 600 to 1.200.

Polyacrylic polyols: There are exemplified compounds having two hydroxy groups, which are obtained through copolymerization of an acrylic acid ester or methacrylic acid ester containing a hydroxy group with a monomer copolymerizable with such an ester.

Acrylic polyols: There are exemplified compounds having two hydroxy groups, which are obtained through polymerization of a (meth)acrylic acid ester or a vinyl monomer.
(Component (C1): SH Group-Containing Compound)

Next, examples of the active hydrogen-containing compound (C1) having an SH group (thiol group) are given below. Examples of the compound having an SH group include polythiol compounds. The polythiol compound which can be utilized for the component (C1) is a compound containing two SH groups in one molecule. Specific examples of such a compound are as follows.
(Component (C1): Aliphatic Thiol Compound)

Bifunctional active hydrogen-containing compounds, such as 1,3-propanedithiol, 1,6-hexanedithiol, 1,10-decanedithiol, 1,8-octanedithiol, 1,4-butanediol bis(3-mercaptopropionate), 1,4-butanediol bis(thioglycolate), 1,6-hexanediol bis(thioglycolate), tetraethylene glycol bis(3-mercaptopropionate), and 1,6-hexandiol bis(3-mercaptopropionate)
(Component (C1): Alicyclic Thiol Compound)

Bifunctional active hydrogen-containing compounds, such as 1,4-bis(mercaptopropyl)thiomethyl)benzene and 2,5-bis(mercaptomethyl)-1,4-dithiane Aromatic thiol compounds, such as 4,6-bis(mercaptomethylthio)-1,3-dithiane
(Component (C1): Bifunctional Composite Active Hydrogen-Containing Compound)

In the present invention, a bifunctional composite active hydrogen-containing compound containing an OH group and an SH group in one molecule can be used. Specific examples thereof include the following compounds.
(Component (C1): OH/SH Type Compound)

Bifunctional active hydrogen-containing compounds, such as 1-hydroxy-4-mercaptocyclohexane and 4-mercaptophenol
<Component (C1): Suitable Bifunctional Active Hydrogen-Containing Compound>

Among those exemplified above, as the bifunctional active hydrogen-containing compound (C1) constituting the urethane prepolymer (B2), in particular, the following compounds are preferably used. Specifically, examples thereof include compounds having hydroxy groups (two in the molecule) only at both ends of a polyester polyol molecule, compounds having hydroxy groups (two in the molecule) only at both ends of a polyether polyol molecule, compounds having hydroxy groups (two in the molecule) only at both ends of a polycaprolactone polyol molecule, compounds having hydroxy groups (two in the molecule) only at both ends of a polycarbonate polyol molecule, ethylene glycol, diethylene glycol, propylene glycol, dipropylene glycol, butylene glycol, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,2-dihydroxydodecane, neopentyl glycol, and polytetramethylene glycol.

Above all, in order that the finally obtained urethane resin may exhibit especially excellent characteristics, it is preferred to produce the urethane prepolymer (B2) by using at least one bifunctional active hydrogen-containing compound (C1) having a molecular weight (number average molecular weight) of 500 to 2,000. A combination of bifunctional active hydrogen-containing compounds which differ in type or molecular weight may be used as the bifunctional active hydrogen-containing compound (C1) having a molecular weight of 500 to 2.000. In addition, in order to control the hardness or the like of the finally obtained urethane resin, on the occasion of forming the urethane prepolymer (B2), a combination of a bifunctional active hydrogen-containing compound (C1) having a molecular weight (number average molecular weight) of 500 to 2,000 and a bifunctional active hydrogen-containing compound (C1) having a molecular weight (number average molecular weight) of 90 to 300 can also be used. In this case, depending on the types and amounts of the bifunctional active hydrogen-containing compound (C1) and the bifunctional iso(thio)isocyanate group-containing compound (B1) in use, when the amount of the bifunctional active hydrogen-containing compound (C1) having a molecular weight of 500 to 2,000 is defined as 100 parts by mass, the amount of the bifunctional active hydrogen-containing compound (C1) having a molecular weight of 90 to 300 is preferably set to 1 to 100 parts by mass.
<Component (B2): Characteristic Features of Urethane Prepolymer (B2)>

The urethane prepolymer (B2) must have an iso(thio)cyanate group at both ends of the molecule. Therefore, the urethane prepolymer (B2) is preferably produced in such a range that a number of moles (n5) of the iso(thio)cyanate group in the bifunctional iso(thio)cyanate group-containing compound (B1) and a number of moles (n6) of the group having active hydrogen of the bifunctional active hydrogen-containing compound (C1) satisfy a relation of $1<(n5)/(n6) \leq 2.31$. In the case where two or more compounds (B1) having an iso(thio)cyanate group at both ends of the molecule are used in combination, the number of moles (n5) of the iso(thio)cyanate group is the total number of moles of the iso(thio)cyanate groups of these iso(thio)cyanate group-containing compounds (B1). In addition, in the case where two or more bifunctional active hydrogen-containing compounds (C1) are used, the number of moles (n6) of the group having active hydrogen is the number of moles of the total of the active hydrogens of these bifunctional active hydrogen-containing compounds.

As mentioned in detail later, in the bifunctional active hydrogen-containing compound (C1), in the case of using a compound having an amino group, the number of moles of the amino group is defined to be equal to the number of moles of active hydrogens.

The iso(thio)cyanate equivalent (value obtained by dividing the molecular weight of the urethane prepolymer (B2) by the number of the iso(thio)cyanate groups in one molecule) of the urethane prepolymer (B2) is preferably 300 to 5,000, more preferably 500 to 3,000, and particularly preferably 700 to 2,000 though it is not particularly limited. Since the urethane prepolymer (B2) in the present invention is preferably linear and synthesized from the bifunctional iso(thio)cyanate group-containing compound (B1) and the bifunctional active hydrogen-containing compound (C1), in this case, the number of the iso(thio)cyanate groups in one molecule is 2.

Although the urethane prepolymer (B2) is one obtained through a reaction between the bifunctional active hydrogen-containing compound (C1) and the bifunctional iso(thio)cyanate group-containing compound (B1), on the occasion of the reaction, all the bifunctional iso(thio)cyanate group-containing compounds (B1) are not entirely reacted but partially remain in an unreacted state. In this case, it is preferred to adjust the average iso(thio)cyanate equivalent of all the iso(thio)cyanate compounds including the urethane prepolymer (B2) and the bifunctional iso(thio)cyanate group-containing compound (B1) to a fixed range.

Even in this case, the iso(thio)cyanate equivalent is preferably 300 to 5,000. That is, the average iso(thio)cyanate equivalent of all the iso(thio)cyanate compounds including the urethane prepolymer (B2) and the bifunctional iso(thio) cyanate group-containing compound (B1) is preferably 300 to 5,000. It may be considered that when the average iso(thio)cyanate equivalent is 300 to 5,000, a polyiso(thio) cyanate compound having a certain molecular weight is used, thereby exhibiting an excellent effect.

In the present invention, it is preferred that the urethane prepolymer (B2) is produced in a range of {<(n5)/(n6)≤2}, such that the bifunctional iso(thio)cyanate group-containing compound (B1) is not contained. That is, it is preferred that the iso(thio)cyanate equivalent of the urethane prepolymer (B2) is 300 to 5,000 by using the polyiso(thio)cyanate compound (B1) composed of only the urethane prepolymer (B2).

The iso(thio)cyanate equivalent of the urethane prepolymer (B2) can be determined by quantitatively determining the amount of the iso(thio)cyanate group which the urethane prepolymer (B2) has in conformity with JIS K7301. The amount of the iso(thio)cyanate group can be quantitatively determined by the following back titration method. The obtained urethane prepolymer (B2) is first dissolved in a dry solvent. Subsequently di-n-butylamine whose amount is apparently larger than the amount of the iso(thio)cyanate group which the urethane prepolymer (B2) has and whose concentration is known is added to the dry solvent, thereby allowing all the iso(thio)cyanate groups of the urethane prepolymer (B2) and di-n-butylamine to react with each. Subsequently, the amount of consumed di-n-butylamine is determined by titrating unconsumed (not involved in the reaction) di-n-butylamine with an acid. Since the amount of the consumed di-n-butylamine is equal to the amount of the iso(thio)cyanate group which the urethane prepolymer (B2) has, the iso(thio)cyanate equivalent can be determined. In addition, since the urethane prepolymer (B2) is a linear urethane prepolymer having an iso(thio)cyanate group at both ends, the number average molecular weight of the urethane prepolymer (B2) is twice as large as the iso(thio) cyanate equivalent. The molecular weight of this urethane prepolymer (B2) is apt to match a measurement value obtained by gel permeation chromatography (GPC). In the case where the urethane prepolymer (B2) and the bifunctional iso(thio)cyanate group-containing compound (B1) are used in combination, a mixture of these may be measured by the aforementioned method.

The reason that the urethane prepolymer (B2) has an iso(thio)cyanate equivalent of preferably 300 to 5,000, more preferably 400 to 3,000, and especially preferably 500 to 2,000 is not elucidated yet but considered as follows. That is, it may be considered that when the urethane prepolymer (B2) having a certain molecular weight reacts with the hydroxy group or the like of the side chain of the polyrotaxane (A), a slidable molecule becomes big and moves greatly, and as a result, recovery from deformation (elastic recovery; low hysteresis loss) tends to occur. Furthermore, it may also be considered that due to the use of the urethane prepolymer (B2), the crosslinking points in the urethane resin are easily dispersed and existent at random and uniformly thereby exhibiting stable performance. It may be further considered that the urethane resin obtained by using the urethane prepolymer (B2) is easily controlled at the time of production and can be suitably used as a polishing pad. It may be considered that this effect is obtained even when the average iso(thio)cyanate equivalent of the polyiso(thio)cyanate compound is 300 to 5,000 at the time of using a combination of the urethane prepolymer (B2) and the bifunctional iso(thio)cyanate group-containing compound (B1). It may also be considered that the aforementioned effect becomes remarkable in the case where only the urethane prepolymer (B2) is used.

Furthermore, the urethane prepolymer (B2) is preferably such that the content of iso(thio)cyanate ((I); molality (mol/kg)) in the urethane prepolymer (B2) which is obtained from the iso(thio)cyanate equivalent of the urethane prepolymer (B2) and the content of a (thio)urethane bond (including a (thio) urea bond) ((U); molality (mol/kg)) in the urethane prepolymer (B2) satisfy a relation of {1≤(U)/(I)≤10}. This range is the same in the case where the urethane prepolymer (B2) and the bifunctional iso(thio)cyanate group-containing compound (B1) are used in combination. However, in the present invention, it is preferred that only the urethane prepolymer (B2) is used. Although the reason for this is not elucidated yet, it may be considered that when the (thio) urethane bond (including the (thio)urea bond) is existent, an interaction with another molecule tends to occur due to the action of a hydrogen bond or the like, thereby making it possible to enhance the characteristics of the obtained urethane resin. The content of iso(thio)cyanate ((I); molality (mol/kg)) is a value obtained by multiplying the inverse of the iso(thio)cyanate equivalent by 1,000. In addition, the content of the (thio)urethane bond (including the (thio)urea bond) ((U) molality (mol/kg)) in the urethane prepolymer is theoretically obtained, for example, by the following method. That is, when the content of the iso(thio)cyanate groups before the reaction existent in the bifunctional active hydrogen-containing compound (C1) and the bifunctional iso(thio)cyanate group-containing compound (B1) constituting the urethane prepolymer (B2) is the total content of isocyanates ((aI); molality (mol/kg)), the content of the (thio)urethane bond (including the thiourea bond) ((U); molality (mol/kg)) is a value ((U)=(aI)−(I)) obtained by subtracting the content of isocyanate ((I); molality (mol/kg)) from the content of all the iso(thio)isocyanate groups of the component (B) ((aI): molality (mol/kg)).

(Production Method of Urethane Prepolymer (B2))

As for the production method of the prepolymer, which is used in the present invention, the urethane prepolymer (B2) having an iso(thio)cyanate group at an end of the molecule may be produced by reacting the bifunctional active hydrogen-containing compound (C1) having two active hydrogens in a molecule thereof and the bifunctional iso(thio) cyanate group-containing compound (B1) having two iso (thio)cyanate groups in a molecule thereof. The production method is not limited at all so long as the prepolymer having an iso(thio)cyanate group at an end can be obtained.

As mentioned above, as for the blending amounts of the bifunctional active hydrogen-containing compound (C1) and the bifunctional iso(thio)cyanate group-containing compound (B1) having two iso(thio)cyanate groups in a molecule thereof, which are preferred in order to obtain the urethane prepolymer (B2), the production is preferably performed in such a range that the number of moles (n5) of the iso(thio)cyanate group in the bifunctional iso(thio)cyanate group-containing compound (B1) and the number of moles (n6) of the active hydrogen of the bifunctional active hydrogen group-containing compound (C1) satisfy a relation of {1<(n5)/(n6)≤2.3}.

In the reaction for producing the urethane prepolymer, it is possible to perform the production upon heating or addition of a urethanization catalyst as the need arises.

<Polyfunctional Active Hydrogen-Containing Compound (C2)>

In the present invention, by using a polyfunctional active hydrogen-containing compound (C2) component other than the polyrotaxane (A) and having three or more groups having active hydrogen in a molecule thereof (hereinafter occasionally referred to simply as "component (C2)" or "polyfunctional active hydrogen-containing compound (C2) component"), a crosslinking density of the obtained urethane resin can be adjusted. As a result, it may be considered that the obtained urethane resin exhibits excellent mechanical characteristics. The polyfunctional active hydrogen-containing compound (C2) can be used without any limitations so long as it is a compound having three or more groups having active hydrogen in a molecule thereof. In addition, two or more kinds of groups having active hydrogen may be contained in one molecule. Examples of the group having active hydrogen include the same groups as those described in the section of the (side chain which the cyclic molecules of the polyrotaxane (A) have).

Although the polyfunctional active hydrogen-containing compound (C2) component is not particularly limited so long as it is a compound having three or more groups having active hydrogen in a molecule thereof, it is preferably one having 3 to 8 groups having active hydrogen, and more preferably one having 3 to 6 groups having active hydrogen in a molecule thereof.

In the present invention, from the standpoint of easiness of control on production of a urethane resin, the group having active hydrogen of the polyfunctional active hydrogen-containing compound (C2) component is preferably a hydroxy group or a thiol group. Furthermore, the polyfunctional active hydrogen-containing compound (C2) can also be used in combination of plural kinds thereof. In the case where a plurality of the compounds are used, the basic mass amount of the component (C2) is the total amount of these plural compounds. Examples of the polyfunctional active hydrogen-containing compound (C2) which is used in the present invention include the following compounds.

(Component (C2): Compound Having an OH Group)

As the compound having an OH group, a compound having three or more OH groups can be used.

Examples thereof include compounds having three or more OH groups in one molecule in which an alkylene group having 2 to 10 carbon atoms is branched. Besides, representative examples thereof include a polyester containing three or more OH groups in one molecule (polyester polyol), a polyether containing three or more OH groups in one molecule (hereinafter referred to as "polyether polyol"), a polycarbonate containing three or more OH groups in one molecule (polycarbonate polyol), a polycaprolactone having three or more OH groups in one molecule (polycaprolactone polyol), and an acrylic polymer containing three or more OH groups in one molecule (polyacrylic polyol).

Specific examples of such a compound are as follows.
(Component (C2) Aliphatic Alcohol)

Polyfunctional OH group-containing compounds, such as glycerin, trimethylolethane, trimethylolpropane, ditrimethylolpropane, trimethylolpropane tripolyoxyethylene ether (for example, TMP-30, TMP-60, and TMP-90 of Nippon Nyukazai Co., Ltd.), butanetriol, 1,2-methyl glycoside, pentaerythritol, dipentaerythritol, tripentaerythritol, sorbitol, erythritol, threitol, ribitol, arabinitol, xylitol, allitol, mannitol, dorcitol, iditol, glycol, inositol, hexanetriol, hexanetetraol, triglycerol, diglycerol, and triethylene glycol (Component (C2): Alicyclic Alcohol)

Polyfunctional OH group-containing compounds, such as tris(2-hydroxyethyl)isocyanurate, cyclohexanetriol, sucrose, maltitol, lactitol, and 1,3,5-adamantanetriol (Component (C2): Aromatic Alcohol)

Polyfunctional OH group-containing compounds, such as trihydroxynaphthalene, tetrahydroxynaphthalene, benzenetriol, biphenyltetraol, pyrogallol, (hydroxynaphthyl) pyrogallol, trihydroxyphenanthrene, 2,4,4'-trihydroxybenzophenone, and α,α,α'-tris(4-hydroxyphenyl)-1-ethyl-4-isopropylbenzene (Component (C2): Other High-Molecular Weight Polyol)

Polyester polyols: There are exemplified trifunctional or higher functional OH group-containing compounds obtained through a condensation reaction between a polyol and a polybasic acid. Above all, the number average molecular weight is preferably 400 to 1,000.

Polyether polyols: There are exemplified trifunctional or higher functional OH group-containing compounds obtained through ring-opening polymerization of an alkylene oxide, or a reaction between a compound having two or more active hydrogen-containing groups in a molecule thereof and an alkylene oxide, and modified products thereof. Above all, the number average molecular weight is preferably 400 to 1.000.

Polycaprolactone polyols: There are exemplified trifunctional or higher functional OH group-containing compounds obtained through ring-opening polymerization of ε-caprolactone. Above all, the number average molecular weight is preferably 400 to 1,000.

Polycarbonate polyols: There are exemplified trifunctional or higher functional OH group-containing compounds obtained through phosgenation of at least one low-molecular weight polyol, or trifunctional or higher functional OH group-containing compounds obtained by transesterification using ethylene carbonate, diethyl carbonate, or diphenyl carbonate. Above all, the number average molecular weight is preferably 400 to 1,000.

Polyacrylic polyols: There are exemplified trifunctional or higher functional OH group-containing compounds obtained through copolymerization of an acrylic acid ester or methacrylic acid ester containing an OH group with a monomer copolymerizable with such an ester. Above all, the number average molecular weight is preferably 400 to 1,000.

Acrylic polyols: There are exemplified trifunctional or higher functional OH group-containing compounds obtained through polymerization of a (meth)acrylic acid ester or a vinyl monomer. Above all, the number average molecular weight is preferably 400 to 1,000.

(Component (C2): Compound Having an SH Group)

As the compound having an SH group, a compound having three or more SH groups can be used.

There are exemplified polyfunctional SH group-containing compounds, such as tetrakis(mercaptomethyl)methane, trimethylolpropane tris(3-mercaptopropionate), trimethylolethane tris(3-mercaptobutyrate), pentaerythritol tetrakis(3-mercaptopropionate), dipentaerythritol hexakis(3-mercaptopropionate), and pentaerythritol tetrakis(3-mercaptobutyrate).

(Component (C2): Composite Polyfunctional Active Hydrogen-Containing Compound)

In the present invention, a composite polyfunctional active hydrogen-containing compound containing an OH group and an SH group in one molecule can be used. Specific examples thereof include the following compounds.
(Component (C2): OH/SH Type Compound)

Composite polyfunctional active hydrogen-containing compounds, such as 3-mercapto-1,2-propanediol, 1,3-dimercapto-2-propanol, 2,3-dimercapto-1-propanol, pentaerythritol tris(3-mercaptopropionate), pentaerythritol mono(3-mercaptopropionate), and pentaerythritol bis(3-mercaptopropionate)

(Component (C2): Suitable Component (C2))

Above all, in order that the finally obtained urethane resin may exhibit especially excellent characteristics, it is preferred to produce the urethane resin by using at least one polyfunctional active hydrogen-containing compound (C2) having a molecular weight (number average molecular weight) of 90 to 1,000. It is preferred to produce the urethane resin by using the component (C2) having a molecular weight (number average molecular weight) in a range of more preferably 90 to 500, and still more preferably 90 to 300. That is, it is preferred that the polyfunctional active hydrogen-containing compound (C2) contains the polyfunctional active hydrogen-containing compound having the aforementioned molecular weight. When the component (C2) falls within this range, it is possible to exhibit appropriate hardness and excellent abrasion resistance.

Above all, in particular, the following compounds are preferably used. Specifically there can be exemplified glycerin, trimethylolethane, trimethylolpropane, ditrimethylolpropane, trimethylolpropane tripolyoxyethylene ether (TMP-30 of Nippon Nyukazai Co., Ltd.), tris(2-hydroxyethyl)isocyanurate, and sorbitol.

(Suitable Blending Ratio of Polymerizable Composition)

In the present invention, a blending ratio of a polymerizable composition containing the urethane prepolymer (B2), the polyrotaxane (A), and the polyfunctional active hydrogen-containing compound (C2), and other compound having a group having active hydrogen, which is blended as the need arises, for example, a bifunctional active hydrogen-containing compound (CH) as mentioned in detail later and/or an amine group-containing compound (CA) (the foregoing polymerizable composition will be hereinafter occasionally referred to simply as "polymerizable composition") is not particularly limited. Above all, in order to exhibit an excellent effect, when the content of all the iso(thio)cyanate groups in the polymerizable composition is defined as 1 mole, it is preferred that the number of moles of all the groups having active hydrogen in the polymerizable composition (total number of moles of the groups having active hydrogen) is 0.8 to 2.0 moles. When the number of the iso(thio)cyanate groups is too large or too small, a curing failure tends to occur, or the abrasion resistance tends to deteriorate in the obtained urethane resin. In order to obtain a urethane resin which is much more well cured, homogeneous, and excellent in abrasion resistance, when the number of moles of the iso(thio)cyanate groups is defined as 1, the number of moles of all the groups having active hydrogen becomes more preferably 0.85 to 1.75 moles, and more preferably 0.9 to 1.5 moles.

The "number of moles of all the groups having active hydrogen" includes the number of moles of all the groups having active hydrogen which the polyrotaxane (A) has, that is, the groups having active hydrogen which the side chains have and groups having active hydrogen at another site (for example, groups having active hydrogen which the cyclic molecules directly have (the hydroxy groups of the α-cyclodextrin ring into which no side chains are introduced when the cyclic molecules are α-cyclodextrin rings)).

However, the hydroxy group or the like of the α-cyclodextrin ring into which no side chain is introduced is low in reactivity. Therefore, in the case of controlling the physical properties of the obtained urethane resin, it is also conceivable to remove this hydroxy group. When the total of the number of moles of the groups having active hydrogen which the side chains of the polyrotaxane (A) have and the number of moles of the polyfunctional active hydrogen-containing compound (C2), and other compound having a group having active hydrogen, which is blended as the need arises, for example, the group having active hydrogen of the bifunctional active hydrogen-containing compound (CH) as mentioned in detail later and/or the amine group-containing compound (CA) (the foregoing total number of moles of the groups having active hydrogen will be hereinafter occasionally referred to simply as "total number of moles of the groups having active hydrogen") is preferably 0.8 to 1.2 moles, more preferably 0.85 to 1.15 moles, and still more preferably 0.9 to 1.1 moles when the number of moles of all the iso(thio)cyanate groups is 1 mole. When this range is satisfied, a urethane resin which is well cured, homogeneous, and excellent in abrasion resistance can be obtained.

In the case where the group having active hydrogen is a hydroxy group, the total number of moles of the groups having active hydrogen which the side chains of the polyrotaxane (A) have may be obtained by determining the hydroxyl number by the method described in the section of Examples. The value of this hydroxyl number is related to the total number of moles of the groups having active hydrogen which the side chains of the polyrotaxane (A) have.

On the occasion of calculating the "number of moles of all the groups having active hydrogen" and the "total number of moles of the groups having active hydrogen", in the case of using a compound having an amino group, such as the amino group-containing compound (CA), it should be construed that the number of moles of active hydrogens of the compound having the amino group is equal to the number of moles of the amino group.

Furthermore, the polymerizable composition which is used in the present invention is not particularly limited. However, in order that the polyurethane resin obtained by curing the polymerizable composition may exhibit an excellent effect, when the total number of moles of the iso(thio)cyanate groups which the urethane prepolymer (B2) has is defined as n1, the total number of moles of all the groups having active hydrogen which the polyrotaxane (A) has is defined as n2, and the total number of moles of the groups having active hydrogen which the polyfunctional active hydrogen-containing compound (C2) has is defined as n3, it is preferred that the amount ratios of the respective components become the following blending ratios. That is, it is preferred that the (n1/n2/n3) ratio is in a range of 100/(8 to 216)/(8 to 108), and as for the of the respective components of n2 and n3, the (n2/n3) ratio is in a range of 1/(0.05 to 13.0). The aforementioned n2 is synonymous with the total number of moles of the groups having active hydrogen which the side chains have and the groups having active hydrogen which the cyclic molecules have.

In the obtained urethane resin, when the ratio of the polyrotaxane (A) is too small, the effect of improving abrasion resistance due to high mobility that the polyrotaxane (A) originally has tends to become small. In addition, when the ratio of the polyrotaxane (A) is too large, the effect of improving the abrasion resistance by crosslinking tends to become small as well. In addition, though it may be considered that the dispersibility of the urethane prepolymer (B2) or the polyfunctional active hydrogen-containing compound (C2) deteriorates, the production of a urethane resin having crosslinking points dispersed uniformly tends to become difficult. Therefore, it is more preferred that the (n1/n2/n3) ratio is 100/(12 to 96)/(16 to 102), and the (n2)/(n3) ratio is 1/(0.2 to 12.0).

In the obtained urethane resin, when the total number of moles of the iso(thio)cyanate groups which the urethane prepolymer (B2) has is defined as n1, the total number of moles of the groups having active hydrogen which the side chains of the polyrotaxane (A) have is defined as ns2, and the total number of moles of the groups having active hydrogen which the polyfunctional active hydrogen-containing compound (C2) has is defined as n3, it is preferred that the amount ratios of the respective components become the following blending ratios. That is, it is preferred that the (n/ns2/n3) ratio is in a range of 100/(8 to 108)/(8 to 108), and as for the of the respective components of ns2 and n3, the (ns2/n3) ratio is in a range of 1/(0.1 to 13.0). The aforementioned ns2 is the "total number of moles of only the groups having active hydrogen which the side chains have" in the polyrotaxane (A). Therefore, the number of moles of the groups having active hydrogen which the cyclic molecules of the polyrotaxane (A) have is not included.

Furthermore, for the same reason as mentioned above, in the obtained urethane resin, in order to more uniformly disperse the crosslinking points, it is more preferred that the (n1/ns2/n3) ratio is in a range of 100/(12 to 96)/(12 to 96), and the (n2/n3) ratio is in a range of 1/(0.1 to 8.0).

In the present invention, the aforementioned polymerizable composition is not particularly limited, but it is preferably composed in the following blending ratio in terms of a mass ratio. That is, it is preferred that the polyrotaxane (A) is contained in the following blending ratio in the obtained urethane resin. It is preferred that the polymerizable composition contains 50 to 2,000 parts by mass of the urethane prepolymer (B2) and 2 to 200 parts by mass of the polyfunctional active hydrogen-containing compound (C2) based on 100 parts by mass of the polyrotaxane (A). When this range is satisfied, the effect which the polyrotaxane (A) has can be thoroughly exhibited. In order to provide a urethane resin having more excellent characteristics, it is more preferred that the polymerizable composition contains 150 to 1,000 parts by mass of the urethane prepolymer (B2) and 4 to 100 parts by mass of the polyfunctional active hydrogen-containing compound (C2) based on 100 parts by mass of the polyrotaxane (A).

In the light of the above, in the present invention, the urethane resin is one obtained through a reaction of the polymerizable composition containing the urethane prepolymer (B2), the polyrotaxane (A), and the polyfunctional active hydrogen-containing compound (C2). On the occasion of performing this reaction, in the present invention, a bifunctional active hydrogen-containing compound (CH) having two groups having active hydrogen and selected from a hydroxy group and a thiol group in a molecule thereof can be further blended in the polymerizable composition. In the case where the polyurethane resin obtained by blending the bifunctional active hydrogen-containing compound (CH) is used for a polishing pad, the polishing characteristics can be made more favorable, for example, the polishing rate is enhanced. Next, this bifunctional active hydrogen-containing compound (CH) is described.

(Bifunctional Active Hydrogen-Containing Compound (CH))

This bifunctional active hydrogen-containing compound (CH) is a compound having two groups having active hydrogen and selected from a hydroxy group and a thiol group in a molecule thereof. Therefore, the aforementioned component (C1) constituting the urethane prepolymer (B) is specifically exemplified.

As for the bifunctional active hydrogen-containing compound (CH), though the aforementioned component (C1) is specifically exemplified, but in view of its role, one having an average molecular weight of 60 to 500 is preferred, and one having an average molecular weight of 90 to 300 is more preferred. That is, the bifunctional active hydrogen-containing compound (CH) is able to adjust the molecular weight and crosslinking degree of the obtained urethane resin. Therefore, one having the aforementioned average molecular weight is preferred.

Above all, when the bifunctional active hydrogen-containing compound (CH) which is especially suitable is exemplified, diol compounds are preferred. Examples of the diol compound include bifunctional active hydrogen-containing compounds (diol compounds), such as ethylene glycol, 1,3-propanediol, propylene glycol, 1,4-butanediol, butylene glycol, diethylene glycol, triethylene glycol, tetraethylene glycol, pentaethylene glycol, hexaethylene glycol, dipropylene glycol, 1,5-pentanediol, 1,6-hexanediol, 1,7-heptanediol, 1,8-dihydroxyoctane, 1,9-dihydroxynonane, 1,10-dihydroxydecane, 1,11-dihydroxyundecane, 1,12-dihydroxydodecane, neopentyl glycol, 3-methyl-1,5-dihydroxypentane, 2-ethyl-1,2-dihydroxyhexane, and 2-methyl-1,3-dihydroxypropane.

(Suitable Blending Ratio (when the Bifunctional Active Hydrogen-Containing Compound (CH) is Contained)

When the total number of moles of the iso(thio)cyanate groups which the urethane prepolymer (B2) has is defined as n1, the total number of moles of the groups having active hydrogen which the side chains of the polyrotaxane (A) have is defined as ns2, the total number of moles of the groups having active hydrogen which the polyfunctional active hydrogen-containing compound (C2) has is defined as n3, and the total number of moles of the groups having active hydrogen which the bifunctional active hydrogen-containing compound (CH) is defined as nh, it is preferred that the amount ratios of the respective components become the following blending ratios. That is, it is preferred that the (n1/ns2/n3/nh) ratio is in a range of 100/(8 to 96)/(8 to 102)(4 to 96), and as for the of the respective components of ns2, n3, and nh, the (ns2/n3/nh) ratio is in a range of 1/(0.1 to 12.5)/(0.1 to 7.5). It is more preferred that the (n1/ns2/n3/nh) ratio is in a range of 100/(12 to 84)/(12 to 96)/(4 to 60), and the (ns2/n3/nh) ratio is in a range of 1/(0.2 to 10)/(0.2 to 5).

When the respective components are blended in this range, a urethane resin having excellent moldability can be provided. Furthermore, the obtained urethane resin is able to reveal excellent abrasion resistance.

In the present invention, the aforementioned polymerizable composition is not particularly limited, but it is preferably composed in the following blending ratio in terms of a mass ratio. That is, it is preferred that the polyrotaxane (A) is contained in the following blending ratio in the obtained urethane resin. It is preferred that the polymerizable composition contains 50 to 2,000 parts by mass of the urethane prepolymer (B2), 2 to 200 parts by mass of the polyfunctional active hydrogen-containing compound (C2), and 3 to 200 parts by mass of the bifunctional active hydrogen-containing compound (CH) based on 100 parts by mass of the polyrotaxane (A). When this range is satisfied, the effect which the polyrotaxane (A) has can be thoroughly exhibited. In order to provide a urethane resin having more excellent characteristics, it is more preferred that the polymerizable composition contains 150 to 1,000 parts by mass of the urethane prepolymer (B2), 4 to 100 parts by mass of the polyfunctional active hydrogen-containing compound (C2), and 5 to 100 parts by mass of the bifunctional active hydrogen-containing compound (CH) based on 100 parts by mass of the polyrotaxane (A).

Above all, in order to exhibit an effect of scratch resistance, as for the polyfunctional active hydrogen-containing compound (C2) and the bifunctional active hydrogen-containing compound (CH), the amount of the bifunctional active hydrogen-containing compound (CH) is preferably 5 to 10.000 parts by mass, more preferably 8 to 3,000 parts by mass, and still more preferably 10 to 1.000 parts by mass based on 100 parts by mass of the polyfunctional active hydrogen-containing compound (C2).

The urethane resin of the present invention is one obtained through a reaction of the polymerizable composition that is a composition containing the urethane prepolymer (B2), the polyrotaxane (A), and the polyfunctional active hydrogen-containing compound (C2). On the occasion of performing this reaction, in the present invention, the polymerizable composition can be blended with a compound having two or more groups having active hydrogen in a molecule thereof and different from the polyrotaxane (A) and the polyfunctional active hydrogen-containing compound (C2). Specifically, the foregoing compound is an amino group-containing compound (CA) satisfying the aforementioned condition. Next, compounds having an amino group are exemplified.

(Amino Group-Containing Compound (CA))

In the present invention, the polymerizable composition can also be further blended with an amino group-containing compound (CA) having at least one amino group in a molecule thereof, with the total number of groups having active hydrogen being two or more (hereinafter occasionally referred to simply as "component (CA)" or "amino group-containing compound (CA)"). As a matter of course, this amino group-containing compound (CA) is a compound different from the polyrotaxane (A) and the polyfunctional active hydrogen-containing compound (C2).

As the amino group-containing compound (CA), a compound having a primary or secondary amino group can also be used. By using such an amino group-containing compound (CA), the obtained urethane resin becomes a urethane urea resin having a urea bond. The urea bonds can take a pseudo-crosslinked structure by a hydrogen bond, or the urea bond is reacted (polymerized) with the iso(thio)cyanate group of the urethane prepolymer (B2) to take a crosslinked structure. Therefore, it is useful for improving the mechanical strength of the obtained urethane resin. In addition, in the amino group-containing compound (CA), the amino group-containing compound in which two amino groups are existent in the molecule can also be used as the component (C1).

In the present invention, the amino group-containing compound (CA) is not particularly limited so long as the number of the amino group which it has in the molecule is one or more. Above all, taking into account easiness of production of the obtained urethane resin, the effect, and so on, the number of the amino group is preferably 2 to 6, more preferably 2 to 4, still more preferably 2 to 3, and especially preferably 2.

The total number of the groups of active hydrogen which the amino group-containing compound (CA) has is preferably 2 to 6, and more preferably 2 to 4.

Although the amino group-containing compound (CA) may be used alone or may also be used in combination of plural kinds thereof it is preferred that an amino group-containing compound having a number average molecular weight of 60 to 1.000 is contained. According to this, the mechanical strength of the urethane resin can be improved. From such a viewpoint, the foregoing number average molecular weight is preferably 80 to 800, and more preferably 100 to 500.

The amino group-containing compound (CA) is classified into an aliphatic amine, an alicyclic amine, an aromatic amine, a composite amino group-containing compound, and a polyamine compound. Of these, an aromatic amine is preferred. Specific examples of the amino group-containing compound (CA) include the following compounds.

(Component (CA): Aliphatic Amine)

Bifunctional active hydrogen-containing compounds, such as ethylenediamine, hexamethylenediamine, nonamethylenediamine, undecanemethylenediamine, dodecamethylenediamine, metaxylenediamine, 1,3-propanediamine, and putrescine; and polyfunctional active hydrogen-containing compounds, such as diethylenetriamine (Component (CA): Alicyclic Amine)

Bifunctional active hydrogen-containing compounds, such as isophoronediamine and cyclohexyldiamine (Component (CA): Aromatic Amine)

Bifunctional active hydrogen-containing compounds, such as 4,4'-methylenebis(o-chloroaniline) (MOCA), 2,6-dichloro-p-phenylenediamine, 4,4'-methylenebis(2,3-dichloroaniline), 4,4'-methylenebis(2-ethyl-6-methylaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, polytetramethylene glycol-di-p-aminobenzoate, 4,4'-diamino-3,3',5,5'-tetraethyldiphenylmethane, 4,4'-diamino-3,3'-diisopropyl-5,5'-dimethyldiphenylmethane, 4,4'-diamino-3,3',5,5'-tetraisopropyldiphenylmethane, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 3,3'-diethyl-4,4'-diaminodiphenylmethane, m-xylylenediamine, N,N'-di-sec-butyl-p-phenylenediamine, m-phenylenediamine, p-xylylenediamine, p-phenylenediamine, 3,3'-methylenebis(methyl-6-aminobenzoate), 2-methylpropyl 3,5-diamino-4-chlorobenzoate, isopropyl 3,5-diamino-4-chlorobenzoate, isopropyl 2,4-diamino-4-chlorophenylacetate, di-(2-aminophenyl)thioethyl terephthalate, diphenylmethanediamine, tolylenediamine, and piperazine; and polyfunctional active hydrogen-containing compounds, such as 1,3,5-benzenetriamine and melamine (Component (CA): Composite Amino Group-Containing Compound)

A composite amino group-containing compound can also be used for the amino group-containing compound (CA). The composite amino group-containing compound is one having an amino group and a hydroxy group in a molecule thereof, and specific examples thereof include the following compounds.

(Component (CA): OH/Amino Group Type Compound)

Bifunctional active hydrogen-containing compounds, such as monoethanolamine and monopropanolamine Polyfunctional active hydrogen-containing compounds, such as diethanolamine and 2-(2-aminoethylamino)ethanol. It should be construed that such compounds are also included in the amino group-containing compound (CA). As a matter of course, in these compounds, it should be construed that the number of moles of active hydrogens of the amino group is equal to that of the amino group, and it should be construed that the number of moles of active hydrogens is the total number of moles of the number of moles of the amino group and the number of moles of the hydroxy group.

The component (CA) may be used alone or may be used in combination of two or more thereof.

In the amino group-containing compound (CA), strictly speaking, the amino group ($-NH_2$) has two active hydrogens. However, in the present invention, in consideration of the reactivity of the active hydrogens of the amino group, it should be construed that the number of moles of the active hydrogens of the compound having an amino group is equal to the number of moles of the amino group. As for a reaction between an amino group and an iso(thio)cyanate group, one active hydrogen in the amino group first reacts with one iso(thio)cyanate group, to form a urea bond/thiourea bond. The active hydrogens in this bond (—NHCONH—, —NHCSNH—) are not involved in the next reaction unless the temperature is high, for example, 150° C. or higher. Therefore, in the present invention, 1 mole of the iso(thio) cyanate group and 1 mole of the amino group (1 mole of active hydrogen in the amino group) react with each other substantially. Consequently, in the present invention, it should be construed that when a compound having an amino group, such as the amino group-containing compound (CA), is used, the number of moles of the active hydrogens of the compound having an amino group is equal to the number of moles of the amino group (the number of moles of the groups having active hydrogen). As a matter of course, it should be construed that in the case of an amino group-containing compound (CA) having a secondary amine group (for example, —NHR) which reacts with the iso(thio)cyanate group, the number of moles of the active hydrogens of this compound having an amino group is equal to the number of moles of the amino group as well.

(Suitable Blending Ratio for Polymerizable Composition (when the Amino Group-Containing Compound (CA) is Contained)

When the total number of moles of the iso(thio)cyanate groups which the urethane prepolymer (B2) has is defined as $n1$, the total number of moles of the groups having active hydrogen which the polyrotaxane (A) have is defined as $n2$, the total number of moles of the groups having active hydrogen which the polyfunctional active hydrogen-containing compound (C2) has is defined as $n3$, and the total number of moles of the groups having active hydrogen including an amino group, which the amino group-containing compound (CA) has, is defined as $n4$, it is preferred that the amount ratios of the respective components become the following blending ratios. That is, it is preferred that the ($n1/n2/n3/n4$) ratio is in a range of $100/(8$ to $192)/(8$ to $102)/(4$ to $96)$, and as for the of the respective components of $n2$, $n3$, and $n4$, the ($n2/n3/n4$) ratio is in a range of $1/(0.1$ to $12.5)/(0.1$ to $7.5)$. It is more preferred that the ($n1/n2/n3/n4$) ratio is in a range of $100/(12$ to $168)/(12$ to $96)/(4$ to $60)$, and the ($n2/n3n4$) ratio is in a range of $1/(0.2$ to $10)/(0.1$ to $5)$. The aforementioned $n2$ is synonymous with the total number of moles of the groups having active hydrogen which the side chains have and the groups having active hydrogen which the cyclic molecules have.

In the obtained urethane resin, when the total number of moles of the iso(thio)cyanate groups which the urethane prepolymer (B2) has is defined as $n1$, the total number of moles of the groups having active hydrogen which the side chains of the polyrotaxane (A) have is defined as $ns2$, the total number of moles of the groups having active hydrogen which the polyfunctional active hydrogen-containing compound (C2) has is defined as $n3$, and the total number of moles of the groups having active hydrogen including an amino group, which the amino group-containing compound (CA) has, is defined as $n4$, it is preferred that the amount ratios of the respective components become the following blending ratios. That is, it is preferred that the ($n/ns2/n3/n4$) ratio is in a range of $100/(8$ to $96)(8$ to $102)/(4$ to $96)$, and it is preferred that the ($n1/ns2/n3/n4$) ratio is in a range of $100/(12$ to $84)/(12$ to $96)/(4$ to $60)$. Furthermore, as for the of the respective components of $ns2$, $n3$, and $n4$, it is preferred that the ($ns2/n3/n4$) ratio is in a range of $1/(0.2$ to $12.5)/(0.2$ to $7.5)$. As for the of the respective components of $ns2$, $n3$, and $n4$, it is preferred that the ($ns2/n3/n4$) ratio is in a range of $1/(0.2$ to $8)/(0.2$ to $5)$. The aforementioned $ns2$ is the total number of moles of only the groups having active hydrogen which the side chains have in the polyrotaxane (A). The number of moles of the groups having active hydrogen which the cyclic molecules of the polyrotaxane (A) have is not included.

When the respective components are blended in the foregoing range, excellent abrasion resistance can be revealed.

In the present invention, the aforementioned polymerizable composition containing the amino group-containing compound (CA) is not particularly limited, but it is preferably composed in the following blending ratio in terms of a mass ratio. That is, it is preferred that the polyrotaxane (A) is contained in the following blending ratio in the obtained urethane resin. It is preferred that the polymerizable composition contains 50 to 2,000 parts by mass of the urethane prepolymer (B2), 2 to 200 parts by mass of the polyfunctional active hydrogen-containing compound (C2), and 5 to 200 parts by mass of the amino group-containing compound (CA) based on 100 parts by mass of the polyrotaxane (A). When this range is satisfied, the effect which the polyrotaxane (A) has can be thoroughly exhibited.

In order to provide a urethane resin having more excellent characteristics, it is more preferred that the polymerizable composition contains 150 to 1.000 parts by mass of the urethane prepolymer (B2), 3 to 100 parts by mass of the poly-functional active hydrogen-containing compound (C2), and 5 to 100 parts by mass of the amino group-containing compound (CA) based on 100 parts by mass of the polyrotaxane (A).

Above all, as for the polyfunctional active hydrogen-containing compound (C2) and the amino group-containing compound (CA), the amount of the amino group-containing compound (CA) is preferably 2.5 to 10,000 parts by mass, more preferably 5 to 3.000 parts by mass, and still more preferably 50 to 1.000 parts by mass based on 100 parts by mass of the polyfunctional active hydrogen-containing compound (C2).

The urethane resin of the present invention is one obtained through a reaction of the polymerizable composition that is a composition containing the urethane prepolymer (B2), the polyrotaxane (A), and the polyfunctional active hydrogen-containing compound (C2). On the occasion of performing this reaction, in the present invention, the polymerizable composition can be blended with the amino group-containing compound (CA) and the bifunctional active hydrogen-containing compound (CH).

(Suitable Blending Ratio (when the Amino Group-Containing Compound (CA) and the Bifunctional Active Hydrogen-Containing Compound (CH) are Contained)

When the total number of moles of the iso(thio)cyanate groups which the urethane prepolymer (B2) has is defined as $n1$,
  the total number of moles of the groups having active hydrogen which the side chains of the polyrotaxane (A) have is defined as $ns2$,
  the total number of moles of the groups having active hydrogen which the poly-functional active hydrogen-containing compound (C2) has is defined as $n3$,
  the total number of moles of the groups having active hydrogen including an amino group, which the amino group-containing compound (CA) has, is defined as $n4$, and the total number of moles of the groups having active hydrogen which the bifunctional active hydrogen-containing compound (CH) has is defined as nh it is preferred that the amount ratios of the respective components become the following blending ratios. That is, it is preferred that the (n1/ns2/n3/n4/nh) ratio is in a range of 100/(8 to 96)(8 to 96)(4 to 90)(4 to 90), and as for the of the respective components of ns2, n3, n4, and nh, the (n2/n3/n4/nh) ratio is in a range of 1/(0.1 to 12)/(0.1 to 7.5)(0.1 to 7.5). In addition, it is preferred that the (n1/ns2/n3/n4/nh) ratio is in a range of 100/(10 to 84)/(10 to 90)/(4 to 30)/(4 to 30), and as for the of the respective components of ns2, n3, n4, and nh, the (ns2/n3/n4/nh) ratio is in a range of 1/(0.2 to 10)/(0.2 to 3)/(0.2 to 3).

When the respective components are blended in this range, a urethane resin having excellent moldability can be provided. Furthermore, the obtained urethane resin is able to reveal excellent abrasion resistance.

In the present invention, the aforementioned polymerizable composition containing the amino group-containing compound (CA) is not particularly limited, but it is preferably composed in the following blending ratio in terms of a mass ratio. That is, it is preferred that the polyrotaxane (A) is contained in the following blending ratio in the obtained urethane resin. It is preferred that the polymerizable composition contains 50 to 2.000 parts by mass of the urethane prepolymer (B2), 2 to 200 parts by mass of the polyfunctional active hydrogen-containing compound (C2), 3 to 200 parts by mass of the amino group-containing compound (CA), and 3 to 200 parts by mass of the bifunctional active hydrogen-containing compound (CH) based on 100 parts by mass of the polyrotaxane (A). When this range is satisfied, the effect which the polyrotaxane (A) has can be thoroughly exhibited.

In order to provide a urethane resin having more excellent characteristics, it is preferred that the polymerizable composition contains 150 to 1,000 parts by mass of the urethane prepolymer (B2), 3 to 100 parts by mass of the polyfunctional active hydrogen-containing compound (C2), 5 to 100 parts by mass of the amino group-containing compound (CA), and 5 to 100 parts by mass of the bifunctional active hydrogen-containing compound (CH) based on 100 parts by mass of the polyrotaxane (A).

Above all, in order to exhibit an effect of scratch resistance, as for the polyfunctional active hydrogen-containing compound (C2) and the amino group-containing compound (CA), it is preferred that the amount of the bifunctional active hydrogen-containing compound (CH) is 2 to 5.000 parts by mass, and the amount of the amino group-containing compound (CA) is 2 to 5,000 parts by mass based on 100 parts by mass of the polyfunctional active hydrogen-containing compound (C2). Furthermore, as for the polyfunctional active hydrogen-containing compound (C2) and the amino group-containing compound (CA), it is more preferred that the amount of the bifunctional active hydrogen-containing compound (CH) is 5 to 1,000 parts by mass, and the amount of the amino group-containing compound (CA) is 5 to 1.000 parts by mass based on 100 parts by mass of the polyfunctional active hydrogen-containing compound (C2)

(Production Method of Urethane Resin)

The urethane resin of the present invention is one obtained through polymerization of a polymerizable composition containing at least the polyrotaxane (A), the urethane prepolymer (B), and the polyfunctional active hydrogen-containing compound (C2). The foregoing polymerizable composition may contain the bifunctional active hydrogen-containing compound (CH) and/or the amino group-containing compound (CA). Furthermore, in the present invention the polymerizable composition can also be blended with other component in addition to the aforementioned five components. As the component which is involved in the polymerization, the bifunctional iso(thio)cyanate group-containing compound (B1) used for production of the urethane prepolymer (B2) can also be used. However, in order to make it easy to control the reaction, it is preferred to use a polymerizable composition containing the polyrotaxane (A), the urethane prepolymer (B2), and the polyfunctional active hydrogen-containing compound (C2), or one in which the foregoing polymerizable composition contains the bifunctional active hydrogen-containing compound (CH) and/or the amino group-containing compound (CA).

(Polymerization Method of Polymerizable Composition)

In the present invention, the polymerizable composition may be first polymerized. The polymerization method is not particularly limited, and a usual method for polymerizing a compound having a group having active hydrogen and a compound having an iso(thio)cyanate group, to obtain a polyurethane resin can be adopted.

In the present invention, as an example of the polymerization method, the component (B2), the component (A), and the component (C2) may be mixed and reacted with each other. In the case where the component (CA) is contained, the component (B2), the component (A), the component (C2), and the component (CA) may be mixed and reacted with each other. In addition, the compound having a group having active hydrogen may be previously mixed and then reacted with the compound having an iso(thio)cyanate group. In the present invention, the component (A) having a group having active hydrogen, the component (C2), and the component (CA) can be previously mixed and then reacted with the component (B).

As for the compounds to be used, those heated before mixing may be prepared, mixed, and then polymerized depending upon the melting points or viscosities thereof. As for the heating temperature, though the temperature to be heated may be appropriately determined, the heating is preferably performed at a temperature in a range of 40 to 150° C.

(Characteristics of Obtained Urethane Resin and Additive)

In the urethane resin of the present invention, pores can be provided in the range. On that occasion, it is possible to adopt a conventionally known foaming method or the like without any limitations. Examples of the method include a foaming agent foaming method in which a volatile foaming agent, such as a low-boiling point hydrocarbon, or water is added; a method in which hollow particles (micro-balloons) are dispersed and cured: a method in which thermally expandable fine particles are mixed and then heated to be foamed; and a mechanical froth foaming method in which air or an inert gas, such as nitrogen, is blown during mixing. When the urethane resin is foamed, the density of the urethane resin is preferably 0.4 to 0.9 g/cm$^3$. In addition, in the case of water foaming, after water is reacted with an iso(thio)cyanate group, carbon dioxide and amino group are produced, and the amino group further reacts with an iso(thio)cyanate group, to form a urea bond/thiourea bond. Therefore, in the present invention, when water is used as an additive, water has two active hydrogens.

<Urethane Resin Containing Hollow Particles>

In the present invention, it is preferred that the polymerizable composition on the occasion of producing the urethane resin contains hollow particles. That is, it is preferred that the polymerizable composition containing the hollow particles is polymerized and cured, to produce the urethane resin containing the hollow particles.

As the hollow particles (micro-balloons), those which are known can be used without any limitations. Specific examples thereof include micro-balloons of a vinylidene chloride resin, a (meth)acrylic resin, a copolymer of acrylonitrile and vinylidene chloride, an epoxy resin, a phenol resin, a melamine resin, or the like. Above all, the hollow particles (micro-balloons) are preferably composed of a urethane-based resin, and specifically, micro-balloons constituted of an outer shell part made of a urethane-based resin and a hollow part surrounded by the outer shell part are preferred. The urethane-based resin is a resin having a urethane bond and/or a urea bond. In the case of using such micro-balloons, a uniform foamed body can be produced efficiently and easily, and a defect, such as a scratch, is hardly formed, and furthermore, the hysteresis loss is reduced as well.

Furthermore, the hollow particles may have a hydrophilic group. For example, in the case where the urethane resin of the present invention is used as a polishing pad material, when the hollow particles have a hydrophilic group, it becomes possible to improve the compatibility with the polishing slurry, and it becomes possible to improve the polishing characteristics. Examples of the hydrophilic group include a hydroxy group, a thiol group, and an ionic group (a group capable of forming at least one ion selected from the group consisting of a carboxy ion, a sulfonic acid ion, a phosphoric acid ion, a phosphonic acid ion, and a quaternary ammonium cation).

Although an average particle diameter of the hollow particles is not particularly limited, it is preferably in the following range. Specifically, it is preferably 1 μm to 500 μm, and more preferably 5 μm to 200 μm.

Although a density of the hollow particles is not particularly limited, too, it is preferably in the following range. Specifically it is preferably 0.01 g/cm$^3$ to 0.5 g/cm$^3$ and more preferably 0.02 g/cm$^3$ to 0.3 g/cm$^3$. The aforementioned density is a density of the hollow particle when expanded. So long as the particle is a hollow particle which is of an unexpanded type and is expanded due to heat on the occasion of curing, it is preferred that the density when expanded is the aforementioned density.

The blending amount of the hollow particles may be appropriately determined according to the targeted application. That is, since the hollow particles are not an essential component, they may not be contained. Therefore, in the polymerizable composition, the blending amount of the hollow particles is preferably 0.1 parts by mass or more and 50 parts by mass or less based on 100 parts by mass of the polyrotaxane (A). However, in order to blend the hollow particles to exhibit a much more excellent effect, the hollow particles are particularly preferably blended in the following amount. That is, the blending amount of the hollow particles is preferably 0.5 parts by mass or more and 50 parts by mass or less, more preferably 0.5 parts by mass or more and 40 parts by mass or less, and still more preferably 0.5 parts by mass or more and 20 parts by mass or less based on 100 parts by mass of the polyrotaxane (A).

In the case of containing the hollow particles, the hollow particles are preferably blended in the following amount relative to the total amount of the respective monomer components. The total amount of the respective monomer components refers to the total amount of the component (B2), the component (A), and the component (C2). In addition, in the case of containing the optionally blended component (CH) and/or component (CA), the total amount means the total amount of the total amount of the component (B2), the component (A) and the component (C2), to which the blending amount of the optionally blended component (CH) and/or component (CA) is added. The blending amount of the hollow particles is preferably 0.001 parts by mass or more and 20 parts by mass or less based on 100 parts by mass of the total amount of the respective monomer components. Furthermore, in order to blend the hollow particles to exhibit a much more excellent effect, the hollow particles are particularly preferably blended in the following amount. Specifically, it is preferred that the blending amount of the hollow particles is 0.02 parts by mass or more and 20 parts by mass or less, and preferably 0.03 parts by mass or more and 10 parts by mass or less based on 100 parts by mass of the total amount of the respective components.

(Other Characteristics and Blending Agent of Obtained Urethane Resin)

The urethane resin of the present invention can be used for a polishing pad because of its excellent mechanical characteristics. In addition, the urethane resin of the present invention can have an arbitrary appropriate hardness. The hardness can be measured according to the Shore method, for example, in conformity with JIS (hardness test) K6253. The urethane resin of the present invention preferably has a Shore hardness of 20 A to 90 D. The Shore hardness of the polyurethane resin for general polishing materials used in the present invention is preferably 30 A to 70 D, and more preferably 40 A to 50 D ("A" means a Shore "A" scale hardness, and "D" means a Shore "D" scale hardness). That is, the urethane resin of the present invention is preferably 20 or more in terms of a Shore A hardness, more preferably 30 or more in terms of a Shore A hardness, and still more preferably 40 or more in terms of a Shore A hardness, and it is preferably 90 or less in terms of a Shore D hardness, more preferably 70 or less in terms of a Shore D hardness, and still more preferably 50 or less in terms of a Shore D hardness. The hardness may be controlled to an arbitrary hardness by changing the blending formulation and the blending amount as the need arises.

Preferably the polyurethane resin of the present invention has a certain range of compressibility to obtain the flatness of an object to be polished. The compressibility can be measured, for example, by a method in conformity with JIS L1096. The compressibility of the urethane resin of the present invention is preferably 0.5% to 50%. Within this range, the excellent flatness of the object to be polished can be obtained.

Since the polyurethane resin of the present invention has a low hysteresis loss or excellent elastic recovery, in the case where it is used as a polishing pad, the flatness of the polished object and a high polishing rate can be revealed. The hysteresis loss can be measured, for example, by a method in conformity with JIS K6251. Specifically the hysteresis loss {(area of elongation and stress when elongated and returned to original state)/(area of elongation and stress when elongated)×100} can be measured by elongating a test specimen prepared in a dumbbell-like form by 100% and returning it to the original state.

Although not particularly limited, the hysteresis loss of the urethane resin of the present invention is preferably 60% or less, more preferably 50% or less, and still more preferably than 40% or less. In the case where the hysteresis loss becomes low, and the urethane resin is used as a polishing pad, it may be assumed that the kinetic energy of the abrasive grains can be used uniformly for the polishing of the object to be polished, thereby making it possible to obtain excellent flatness and a high polishing rate. Furthermore, it may be considered that when the hysteresis loss becomes low, even in the case of a soft pad, an excellent polishing rate can be revealed.

The urethane resin of the present invention may be provided with a polishing layer formed of a plurality of layers. For example, in the case where the urethane resin of the present invention is composed of two layers, the aforementioned polishing layers may include a first layer having a polishing surface coming into contact with the object to be polished and a second layer coming into contact with the first layer on the side opposite to the polishing surface of the first layer. In this case, the second layer has hardness and elastic modulus which differ from those of the first layer, thereby making it possible to adjust the physical properties of the first layer. For example, the polishing properties of the object to be polished can be adjusted by making the hardness of the first layer different from the hardness of the second layer.

The urethane resin of the present invention may be prepared as so-called "fixed abrasive grain urethane resin" by containing abrasive grains therein as a constituent element. For example, the abrasive grains are grains made of a material selected from cerium oxide, silicon oxide, alumina, silicon carbide, zirconia, iron oxide, manganese dioxide, titanium oxide, and diamond, or grains made of two or more of these materials. Furthermore, as for these abrasive grains, those in which the surfaces thereof have been modified can also be used. For example, in the case of using the urethane resin of the present invention as a polishing pad, by using abrasive grains in which the surfaces thereof have been modified with a hydrophilic group, the compatibility with the slurry or water during polishing is improved, thereby making it possible to improve the polishing characteristics. Examples of the hydrophilic group include a hydroxy group, a thiol group, and an ionic group (a group capable of forming at least one ion selected from the group consisting of a carboxy ion, a sulfonic acid ion, a phosphoric acid ion, a phosphonic acid ion, and a quaternary ammonium cation). In addition, though the method of holding these abrasive grains is not particularly limited, for example, after the abrasive grains are dispersed in the aforementioned polymerizable composition, they can be held inside the urethane resin by curing the polymerizable composition.

Besides, a polymerization catalyst, a stabilizer, such as an antioxidant, an ultraviolet absorbent, a surfactant, a flame retardant, a plasticizer, a pigment, a filler, an antistatic agent, a foam stabilizer, and other additives may be added to the urethane resin of the present invention. These additives may be used alone or may be used in combination of two or more thereof. By containing such an additive in the polymerizable composition to polymerize the polymerizable composition, it can be contained in the urethane resin for polishing.

A groove structure can be formed on the surface of the urethane resin of the present invention though it is not particularly limited. The groove structure is not particularly limited so long as it has a form for holding and renewing a slurry on the occasion of polishing the member to be polished. Examples of the groove include an X (stripe) groove, an XY lattice groove, a concentric groove, a throughhole, a non-throughhole, a polygonal prism, a cylindrical groove, a spiral groove, an eccentric groove, a radial groove, and a combination thereof.

Although the method of forming the groove structure is not particularly limited, examples thereof include a method in which a jig, such as a polishing tool having a predetermined size, is used to mechanically cut a resin; a method in which a resin is poured into a mold having a predetermined surface shape and cured; a method in which a resin is pressed with a press plate having a predetermined surface shape; a method using photolithography; a method using a printing technique; and a method using a laser beam from a carbon dioxide laser.

The urethane resin of the present invention can also be, for example, used as a nonwoven urethane resin polishing pad which is obtained by impregnating nonwoven cloth with the urethane resin of the present invention and then curing the urethane resin. In addition, besides the aforementioned polishing pad, it is also possible to use the urethane resin of the present invention for a buffer material, a damping material, a sound absorbing material, and so on. Furthermore, the polymerizable composition which is used in the present invention is also applicable for the aforementioned nonwoven fabric polishing pad, buffer material, damping material, or sound absorbing material by coating or impregnating a nonwoven fabric and then curing.

EXAMPLES

Next, the present invention is described in detail by reference to Examples and Comparative Examples, but it should be construed that the present invention is not limited to these Examples. In the following Examples and Comparative Examples, evaluation methods and so on are as follows.

(Used Polyrotaxane (A))

RX-1: Polyrotaxane in which a molecular weight of side chains having a hydroxy group on the side chains is about 350 in average, a weight average molecular weight is 200,000, and a hydroxyl number of 87 mgKOH/g RX-2: Polyrotaxane in which a molecular weight of side chains having a hydroxy group on the side chains is about 650 in average, a weight average molecular weight is 350,000, and a hydroxyl number of 55 mgKOH/g The total number of moles (ns2) of the groups having active hydrogen which the side chains of the polyrotaxane (A) have can be determined from a value of this hydroxyl number.

(Measurement of Molecular Weight: Gel Permeation Chromatography (GPC Measurement))

A liquid chromatograph (manufactured by Nihon Waters K.K.) was used as an apparatus for GPC measurement. Shodex GPC KF-802 (exclusion limit molecular weight: 5,000), KF802.5 (exclusion limit molecular weight: 20.000), KF-803 (exclusion limit molecular weight: 70.000), KF-804 (exclusion limit molecular weight: 400,000), or KF-805 (exclusion limit molecular weight: 2,000.000), all of which are manufactured by Showa Denko K.K., was appropriately used as a column according to the molecular weight of a sample to be analyzed. In addition, dimethyl formamide (DMF) was used as a developing solution, and the measurement was performed under a condition at a flow rate of 1 mL/min and a temperature of 40° C. Polystyrene was used as a reference sample, and the weight average molecular weight was determined by comparative conversion. A differential refractometer was used as a detector.

(Measurement of Hydroxyl Number)

The hydroxyl number was determined by the measurement method in conformity with JIS K0070.

<Production Method of Used Polyrotaxane (A)>

Production Example (Production of RX-1)

(1-1) Preparation of PEG-COOH:

Linear polyethylene glycol (PEG) having a molecular weight of 10.000 was prepared as a polymer for forming an axial molecule.
Formulation:

10 g of PEG, 100 mg of TEMPO (2,2,6,6-tetramethyl-1-piperidinyloxy radical), and 1 g of sodium bromide were prepared, and the respective components were dissolved in 100 mL of water, 5 mL of a commercially available sodium hypochlorate aqueous solution (effective chlorine content: 5%) was added to this solution and stirred at room temperature for 10 minutes. Thereafter, a maximum of 5 mL of ethanol was added to terminate the reaction. After performing extraction with 50 mL of methylene chloride, the methylene chloride was distilled off, and the residue was dissolved in 250 mL of ethanol and reprecipitated at a temperature of −4° C. over 12 hours. Then. PEG-COOH was collected and dried.

(1-2) Preparation of Polyrotaxane:

3 g of PEG-COOH prepared above and 12 g of α-cyclodextrin (α-CD) were each dissolved in 50 mL of warm water at 70° C., and the obtained respective solutions were fully mixed by shaking. Subsequently this mixed solution was reprecipitated at a temperature of 4° C. for 12 hours, and the precipitated clathrate complex was freeze-dried and collected. After 0.13 g of adamantanamine was dissolved in 50 ml of dimethyl formamide (DMF) at room temperature, the aforementioned clathrate complex was added to and fully mixed with the resulting solution quickly by shaking. Subsequently, a solution prepared by dissolving 0.38 g of a BOP reagent (benzotriazol-1-yl-oxy-tris(dimethylamino)phosphonium hexafluorophosphate) in DMF was further added and fully mixed by shaking. Furthermore, a solution prepared by dissolving 0.14 ml of diisopropylethylamine in DMF was added and fully mixed by shaking, to obtain a slurry reagent.

The slurry reagent obtained above was allowed to stand at 4° C. for 12 hours. Thereafter, 50 mL of a DMF/methanol mixed solvent (volume ratio: 1/1) was added to and mixed with the reagent, and the obtained mixture was then centrifuged to discard the supernatant. Furthermore, after washing with the above DMF/methanol mixed solution was performed, the resultant was washed with methanol and then centrifuged to obtain a precipitate. After the obtained precipitate was vacuum dried, the resultant was dissolved in 50 mL of DMSO (dimethyl sulfoxide), and the obtained transparent solution was added dropwise to 700 mL of water, to precipitate a polyrotaxane. The precipitated polyrotaxane was collected by means of centrifugation and then vacuum dried. Furthermore, the polyrotaxane was dissolved in DMSO, precipitated in water, and then collected and dried to obtain a purified polyrotaxane. At this time, the clathrating number of α-CD is 0.25.

Here, the clathrating number was calculated by dissolving the polyrotaxane in DMSO-de and measuring with a 1H-NMR measuring instrument (JNM-LA500, manufactured by JEOL Ltd.) in accordance with the following method.

X, Y and X/(Y−X) mean the following.
X: Integrated value of a proton derived from a hydroxy group of 4 to 6 ppm of cyclodextrin
Y: Integrated value of a proton derived from methylene chains of 3 to 4 ppm of cyclodextrin and PEG
X/(Y−X): A proton ratio of cyclodextrin to PEG
X/(Y−X) when the maximum clathrating number was theoretically 1 was first calculated and then compared with X/(Y−X) calculated from the analytical value of the actual compound, to calculate the clathrating number.

(1-3) Introduction of Side Chains into Polyrotaxane:

500 mg of the above purified polyrotaxane was dissolved in 50 mL of a 1 mol/L NaOH aqueous solution, and 3.83 g (66 mmol) of propylene oxide was added thereto, followed by stirring in an argon atmosphere at room temperature for 12 hours. Subsequently the above polyrotaxane solution was neutralized to a pH of 7 to 8 by using a 1 mol/L HCl aqueous solution, dialyzed with a dialysis tube, and then freeze-dried to obtain a hydroxypropylated polyrotaxane. The obtained hydroxypropylated polyrotaxane was identified by means of 1H-NMR and GPC and confirmed as a hydroxypropylated polyrotaxane having a desired structure.

The modification degree of the OH groups of the cyclic molecules by the hydroxypropyl group was 0.5, and the weight average molecular weight Mw measured by GPC was 50,000.

5 g of the obtained hydroxypropylated polyrotaxane was dissolved in 15 g of ε-caprolactone at 80° C., to prepare a mixed solution. After this mixed solution was stirred at 110° C. for 1 hour while blowing dry nitrogen, 0.16 g of a 50 wt % xylene solution of tin(II) 2-ethylhexanoate was added, and the mixture was stirred at 130° C. for 6 hours. Thereafter, xylene was added to obtain a polycaprolactone-modified polyrotaxane xylene solution having a nonvolatile content of about 35% by mass, into which side chains had been introduced.

(1-4) Preparation of OH Group-Introduced Side Chain-Modified Polyrotaxane (RX-1: Corresponding to Polyrotaxane (A) Used in the Present Invention)

The polycaprolactone-modified polyrotaxane xylene solution prepared above was added dropwise to hexane, collected, and then dried to obtain a side chain-modified polyrotaxane (RX-1) having OH groups at the ends of the side chains.

The physical properties of this polyrotaxane (A): RX-1 were as follows.

Weight average molecular weight Mw of polyrotaxane (GPC): 200,000
Hydroxyl number: 87 mgKOH/g
Side chain modification degree: 0.5 (50% as expressed in terms of %)
Side chain molecular weight: about 350 in average
The product is the polyrotaxane (A) having hydroxy groups at the ends of the side chains.
Clathrating number of α-CD: 0.25

<Production of RX-2>

RX-2 was prepared in the same manner as in RX-1, except that the amount of the ε-caprolactone was changed to 30 g. The physical properties of this polyrotaxane (RX-2) were as follows.

Side chain modification degree: 0.5 (50%)
Side chain molecular weight: about 650 in average
Weight average molecular weight Mw of polyrotaxane (GPC): 350.000
Hydroxyl number: 55 mgKOH/g
The product is the polyrotaxane (A) having hydroxy groups at the ends of the side chains.
Clathrating number of α-CD: 0.25

<Urethane Prepolymer (B2)>

A urethane prepolymer (B2) shown in Table 1 below was prepared.

TABLE 1

| (B2) Abbreviation | Used component (B1) Used component (C1) | Iso(thio) cyanate equivalent | * (U)/(I) |
|---|---|---|---|
| Pre-1 | (B1) 2,4-Tolylene diisocyanate (C1) Polyoxytetramethylene glycol (number average molecular weight: 1,000) (C1) 1,4-Butanediol | 319 | 1.0 |
| Pre-2 | (B1) 2,4-Tolylene diisocyanate (C1) Polyoxytetramethylene glycol (number average molecular weight: 1,000 (C1) Diethylene glycol | 905 | 2.4 |
| Pre-3 | (B1) 2,4-Tolylene diisocyanate (C1) Polyoxytetramethylene glycol (number average molecular weight: 1,000) (C1) Diethylene glycol | 539 | 1.1 |
| Pre-4 | (B1) 2,4-Tolylene diisocyanate (C1) Polyoxytetramethylene glycol (number average molecular weight: 1,000) (C1) Diethylene glycol | 1500 | 3.9 |
| Pre-5 | (B1) 2,4-Tolylene diisocyanate (C1) Polyoxytetramethylene glycol (number average molecular weight: 1,000) (C1) Diethylene glycol | 338 | 0.5 |
| Pre-6 | (B1) 2,4-Tolylene diisocyanate (C1) Polyoxytetramethylene glycol (number average molecular weight: 1,000) (C1) Diethylene glycol | 2116 | 5.5 |

* (I): Content of iso(thio)cyanate existent in prepolymer (molality (mol/kg))
(U): Content of urethane bond (urea bond) existent in prepolymer (molality (mol/kg))

Production Examples of Urethane Prepolymer (B2)

Production Example: Production Example of Pre-1

50 g of 2,4-tolylene diisocyanate, 32 g of polyoxytetramethylene glycol (number average molecular weight: 1,000), and 10 g of 1,4-butanediol were reacted with each other in a nitrogen atmosphere in a flask equipped with a nitrogen introduction tube, a thermometer, and a stirrer at 80° C. for 8 hours, to obtain a terminal isocyanate urethane prepolymer having an iso(thio)cyanate equivalent of 319 (Pre-1).

Production Example: Production Example of Pre-2

1,000 g of 2,4-tolylene diisocyanate and 1,800 g of polyoxytetramethylene glycol (number average molecular weight: 1,000) were reacted with each other in a nitrogen atmosphere in a flask equipped with a nitrogen introduction tube, a thermometer, and stirrer at 70° C. for 4 hours. Thereafter, 240 g of diethylene glycol was added to further carry out a reaction at 70° C. for 4 hours so as to obtain a terminal isocyanate urethane prepolymer having an iso(thio)cyanate equivalent of 905 (Pre-2).

Production Example: Production Example of Pre-3

A terminal isocyanate urethane prepolymer having an iso(thio)cyanate equivalent of 539 (Pre-3) was obtained in the same method as in the Production Example of Pre-2, except for using 130 g of diethylene glycol.

Production Example: Production Example of Pre-4

A terminal isocyanate urethane prepolymer having an iso(thio)cyanate equivalent of 1,500 (Pre-4) was obtained in the same method as in the Production Example of Pre-2, except for using 2,300 g of polyoxytetramethylene glycol (number average molecular weight: 1,000).

Production Example: Production Example of Pre-5

A terminal isocyanate urethane prepolymer having an iso(thio)cyanate equivalent of 338 (Pre-5) was obtained in the same method as in the Production Example of Pre-2, except for using 1,500 g of polyoxytetramethylene glycol (number average molecular weight: 1.000) and using 50 g of diethylene glycol.

Production Example: Production Example of Pre-6

A terminal isocyanate urethane prepolymer having an iso(thio)cyanate equivalent of 2,116 (Pre-6) was obtained in the same method as in the Production Example of Pre-2, except for using 2,500 g of polyoxytetramethylene glycol (number average molecular weight: 1.000) and using 250 g of diethylene glycol.

<Polyfunctional Active Hydrogen-Containing Compound (C2)>

TMP: Trimethylolpropane
Polyether 4000: EXENOL 4030, manufactured by Asahi Glass Co., Ltd. (polyether polyol having a number average molecular weight of 4,000 and having three hydroxy group)
di-TMP: Ditrimethylolpropane
Glycerin
Sorbitol
PEG-PPG: A block copolymer of polyethylene glycol and polypropylene glycol, having a number average molecular weight of 3.000 and having three hydroxy groups <Amino Group-Containing Compound (CA)>
MOCA: 4,4'-Methylenebis(o-chloroaniline), number average molecular weight: 267
DMTDA: A mixture of bis(methylthio)-2,4-toluenediamine and bis(methylthio)-2,6-toluenediamine, number average molecular weight: 214: HEART CURE 30, manufactured by Kumiai Chemical Industry Co., Ltd.
IACB: 2-Methylpropyl 3,5-diamino-4-chlorobenzoate, number average molecular weight: 243

<Bifunctional Active Hydrogen-Containing Compound (CH)>
PTMG 650: Polytetramethylene glycol (number average molecular weight: 650)
PTMG 1000: Polytetramethylene glycol (number average molecular weight: 1,000)
1,4-BuOH: 1,4-Butanediol
DEG: Diethylene glycol
PEG 400: Polyethylene glycol having a number average molecular weight of 400

<Bifunctional Iso(thio)cyanate Group-Containing Compound (B1)>
TDI: 2,4-Toluene diisocyanate <Other Components>
Hollow Particles 1: Microcapsule 920-40 having a density of 0.13 g/cm (manufactured by Japan Fillite Co., Ltd.), hollow particles made of a copolymer of an acrylic monomer and vinylidene chloride
Hollow Particles 2: Micro-balloons (hollow particles) made of a urethane resin having a hollow particle diameter of 30 μm and a density of 0.13 g/cm³ the hollow particles 2 are a hollow particle made of a urethane-based resin <Production Method of Hollow Particles 2/Production Method of Urethane Resin-Made Micro-Balloons>

To 650 g of polyethylene terephthalate diol (number average molecular weight: 2,000), 1,000 g of toluene was added, 142 g of isophorone diisocyanate was further added, and the mixture was reacted under toluene reflux at 120° C. for 5 hours. After cooling to room temperature, 25 g of hexamethylenediamine and 20 g of diethylenetriamine were added, and the mixture was reacted at 60° C. for 5 hours. Thereafter, the toluene was distilled off under reduced pressure, to obtain a polyurethane resin having a hydroxy group at the both ends and having urethane and urea bonds, 400 g of the obtained resin, 12 g of iron oxide, 62 g of n-hexane, and 380 g of ethyl acetate were mixed, and the mixture was dispersed while adding dropwise in 2,000 g of a 0.5% polyvinyl alcohol aqueous solution as previously prepared. The obtained resin was taken out from water through filter paper filtration and dried with a circulation dryer at 40° C. The resulting spherical body was crushed and sieved by using an ultrasonic classifier, to obtain urethane micro-balloons.

Example 1

RX-1 (100 parts by mass) as the component (A) and TMP (31.6 parts by mass) as the component (C2) were mixed at 120° C. to prepare a homogeneous solution, which was then thoroughly deaerated and cooled to 100° C. (Solution 1). Separately, to the Pre-2 (820 parts by mass) as the component (B2) heated at 70° C., the Hollow Particles 1 (7.1 parts by mass) as other component were added, and the mixture was stirred with a planetary centrifugal mixer, to obtain a homogenous solution (Solution 2). To the above-prepared Solution 2, the Solution 1 was added to obtain a polymerizable composition, and the polymerizable composition was injected into a casting mold and cured at 100° C. After completion of the polymerization, the urethane resin was taken out from the casting mold, to obtain a urethane resin having a thickness of 2 mm.

(A): 100 parts by mass of RX-1
(B2): 820 parts by mass of Pre-2
(C2): 31.6 parts by mass of TMP
(Others): 7.1 parts by mass of Hollow Particles 1

Each of the blending amounts is shown in Table 2. In addition, the number of moles of functional groups of the respective components (molar ratio of the "groups having active hydrogen" which the side chains of the polyrotaxane (A) have, the groups having active hydrogen" of the component (C2), and the "groups having active hydrogen" of the component (CA)) and a molar ratio of the total number of moles of those "groups having active hydrogen" to the content of all the iso(thio)isocyanate groups are shown in Table 3. In addition, evaluations were performed as follows.

The above obtained urethane resin had a polishing rate of 3.4 μm/hr, a scratch resistance of 1, a Taber abrasion loss of 19 mg, a hardness of 55 in terms of a Shore A hardness, a density of 0.7 g/cm³, and a hysteresis loss of 20%. The results are shown in Table 3.

[Evaluation Items]

(1) Polishing rate: A polishing condition is shown below.
Polishing pad: 380φ
Object to be polished: three 2-inch sapphire wafers
Slurry: FUJIMI COMPOL 80 stock solution
Pressure: 411 g/cm²
Revolution: 60 rpm
Time: 1 hour The polishing rate was measured on the occasion of performing the polishing under the aforementioned condition.

(2) Scratch resistance: The existence or nonexistence of a scratch in wafers which were polished under the condition described in the above (1) was checked. The evaluation was made according to the following criteria.
1: No scratch is seen visually and through a laser microscope.
2: A scratch cannot be seen visually but can be seen through a laser microscope.
3: One or two scratches can be seen visually only at edges of wafers.
4: Three or more scratches can be seen visually only at the edges of wafers, or one or two scratches can be seen in whole wafers.
5: Three or more scratches can be seen visually in whole wafers.

(3) Taber abrasion loss: This was measured with the Model 5130 of Taber Co., Ltd. A Taber abrasion test was performed with the H-18 abrasion wheel under a load of 1 kg at a revolution speed of 60 rpm and a revolution number of 1.000.

(4) Hardness: The Shore A hardness and the Shore D hardness were measured with a durometer, manufactured by Kobunshi Keiki Co., Ltd. in conformity with the JIS (hardness test) K6253. A sample having a relatively low hardness (less than 20 in terms of a Shore D hardness) was measured in terms of a Shore A hardness, and a sample having a relatively high hardness was measured in terms of a Shore D hardness.

(5) Density: The density was measured with "DSG-1", manufactured by Toyo Seiki Seisaku-sho Ltd.

(6) Hysteresis loss: A urethane resin punched into a dumbbell No. 8 form having a thickness of 2 mm was elongated 20 mm at a rate of 10 mm/min with the AG-SX autograph, manufactured by Shimadzu Corporation, and then, the hysteresis loss was measured until the stress returned to zero.

Examples 2 to 11 and Comparative Examples 1 and 2

Cured bodies were fabricated and evaluated in the same manner as in Example 1, except that polymerizable compositions each having a formulation shown in Table 2 were used. The results are shown in Table 4.

In the case of using the component (CA) or the component (CH), the foregoing component was blended in the Solution 1 in Example 1, to obtain a cured body (urethane resin).

In Comparative Example 1, the resin was fragile, and the resin was broken during the polishing test. Thus, the polishing test could not be carried out.

TABLE 2

| No. | Component (A) (parts by mass) | Component (B2) (parts by mass) | Component (C2) (parts by mass) | Component (CA) (parts by mass) | Other Component (parts by mass) | Component (CH) (parts by mass) |
| --- | --- | --- | --- | --- | --- | --- |
| Example 1 | RX-1 (100) | Pre-2 (820) | TMP (31.6) | — | Hollow Particles 1 (7.1) | — |

TABLE 2-continued

| No. | Component (A) (parts by mass) | Component (B2) (parts by mass) | Component (C2) (parts by mass) | Component (CA) (parts by mass) | Other Component (parts by mass) | Component (CH) (parts by mass) |
|---|---|---|---|---|---|---|
| Example 2 | RX-1 (100) | Pre-2 (1525) | TMP (79.7) | — | Hollow Particles 1 (12.8) | — |
| Example 3 | RX-1 (100) | Pre-4 (490) | Glycerin (4.8) | — | Hollow Particles 1 (4.5) | — |
| Example 4 | RX-1 (100) | Pre-5 (873) | TMP (131.7) | — | Hollow Particles 1 (8.3) | — |
| Example 5 | RX-1 (100) | Pre-3 (123) | Polyether 4000 (36.5) | — | Hollow Particles 1 (2.0) | — |
| Example 6 | RX-1 (100) | Pre-2 (295) | TMP (3.7) | MOCA (9.5) | Hollow Particles 1 (3) | — |
| Example 7 | RX-1 (100) | Pre-6 (1367) | TMP (6.9) | MOCA (62.1) | Hollow Particles 1 (11) | — |
| Example 8 | RX-1 (100) | Pre-1 (65.1) | di-TMP (3.2) | — | Hollow Particles 1 (1.3) | — |
| Example 9 | RX-2 (100) | Pre-3 (278) | TMP (17.5) | — | — | — |
| Example 10 | RX-1 (100) | Pre-2 (820) | TMP (31.6) | — | Hollow Particles 2 (28) | — |
| Example 11 | RX-1 (100) | Pre-2 (304) | TMP (3.7) | MOCA (9.5) | Hollow Particles 2 (12) | — |
| Comparative Example 1 | RX-1 (100) | Pre-2 (759) | — | — | Hollow Particles 1 (5.4) | PTMG 650 (202) |
| Comparative Example 2 | — | Pre-2 (800) | TMP (36.6) | — | Hollow Particles 1 (6.3) | — |

TABLE 3

| No. | Number of moles of functional group n1/n2/n3/(n4) | (Number of moles of all the groups having active hydrogen)/ (Number of moles of all the iso(thio) cyanate groups) | Number of moles of functional group n1/ns2/n3/(n4)/(nh) | (Total number of moles of the groups having active hydrogen)/ (Number of moles of all the iso(thio) cyanate groups) |
|---|---|---|---|---|
| Example 1 | 100/34.2/77.9 | 1.12/1 | 100/17.1/77.9 | 0.95/1 |
| Example 2 | 100/18.4/105.8 | 1.24/1 | 100/9.2/105.8 | 1.15/1 |
| Example 3 | 100/95/47.5 | 1.43/1 | 100/47.5/47.5 | 0.95/1 |
| Example 4 | 100/12/114 | 1.26/1 | 100/6/114 | 1.2/1 |
| Example 5 | 100/136/12 | 1.48/1 | 100/68/12 | 0.8/1 |
| Example 6 | 100/95/25.7/(21.9) | 1.43/1 | 100/47.5/25.7/(21.9) | 0.95/1 |
| Example 7 | 100/48/24/(72) | 1.44/1 | 100/24/24/(72) | 1.2/1 |
| Example 8 | 100/152/19 | 1.71/1 | 100/76/19 | 0.95/1 |
| Example 9 | 100/38/76 | 1.14/1 | 100/19/76 | 0.95/1 |
| Example 10 | 100/34.2/77.9 | 1.12/1 | 100/17.1/77.9 | 0.95/1 |
| Example 11 | 100/95/25.7/(21.9) | 1.43/1 | 100/47.5/25.7/(21.9) | 0.95/1 |
| Comparative Example 1 | 100/38/0 | 1.14/1 | 100/19/0/(0)/(76) | 0.95/1 |
| Comparative Example 2 | 100/0/95 | 0.95/1 | 100/0/0.95 | 0.95/1 |

TABLE 4

| No. | Polishing rate μm/hr | Scratch resistance | Taber abrasion loss (mg) | Hardness | Density (g/cm$^3$) | Hysterisis loss (%) |
|---|---|---|---|---|---|---|
| Example 1 | 3.4 | 1 | 19 | 55 (Shore A harness) | 0.7 | 20 |
| Example 2 | 2.0 | 2 | 28 | 50 (Shore A harness) | 0.7 | 45 |
| Example 3 | 3.2 | 1 | 18 | 57 (Shore A harness) | 0.7 | 20 |
| Example 4 | 1.5 | 3 | 30 | 40 (Shore D harness) | 0.7 | 55 |
| Example 5 | 2.9 | 1 | 22 | 48 (Shore A harness) | 0.7 | 20 |

TABLE 4-continued

| No. | Polishing rate μm/hr | Scratch resistance | Taber abrasion loss (mg) | Hardness | Density (g/cm³) | Hysterisis loss (%) |
|---|---|---|---|---|---|---|
| Example 6 | 3.5 | 1 | 17 | 20 (Shore D harness) | 0.7 | 20 |
| Example 7 | 2.1 | 3 | 30 | 25 (Shore D harness) | 0.8 | 30 |
| Example 8 | 2.8 | 2 | 25 | 50 (Shore A harness) | 0.7 | 25 |
| Example 9 | 2.2 | 2 | 18 | 58 (Shore A harness) | 1 | 25 |
| Example 10 | 3.8 | 1 | 16 | 55 (Shore A harness) | 0.9 | 12 |
| Example 11 | 4.0 | 1 | 15 | 20 (Shore D harness) | 0.9 | 10 |
| Comparative Example 1 | — | — | — | 45 (Shore A harness) | 0.7 | 30 |
| Comparative Example 2 | 0.7 | 5 | 55 | 20 (Shore D harness) | 0.7 | 40 |

As is clear from the foregoing Examples and Comparative Examples, it is evident that the urethane resins obtained in the present invention have excellent abrasion resistance and polishing characteristics.

Examples 12 to 23 and Comparative Examples 3 and 4

Cured bodies (urethane resin) were fabricated and evaluated in the same manner as in Example 1, except that polymerizable compositions each having a formulation shown in Table 5 were used. The results are shown in Table 7. In the case of using the component (CA) or the component (CH), the foregoing component was blended in the Solution 1 in Example 1, to obtain a cured body (urethane resin).

In Comparative Example 4, the resin was fragile, and the resin was broken during the polishing test. Thus, the polishing test could not be carried out.

Comparative Example 5

RX-1 (100 parts by mass) as the component (A) and TMP (31.6 parts by mass) as the component (C2), and PTMG 1000 (486 parts by mass) and DEG (64.7 parts by mass) as the component (CH) were mixed at 80° C. to prepare a homogeneous solution, which was then thoroughly deaerated. 920-40 (7.1 parts by mass) as the other component was stirred with a planetary centrifugal mixer, to obtain a homogenous solution (Solution 1). To the above-prepared Solution 1, TDI (270 parts by mass) as the component (B1) was added, and the mixture was homogeneously mixed. The resulting polymerizable composition was injected into a casting mold and cured at 100° C. After completion of the polymerization, the urethane resin was taken out from the casting mold, to obtain a urethane resin having a thickness of 2 mm.

Each of the blending amounts is shown in Table 5. In addition, the number of moles of functional groups of the respective components (a molar ratio of the "groups having active hydrogen" which the side chains of the polyrotaxane (A) have, the "groups having active hydrogen" of the component (C2), the "groups having active hydrogen" of the component (CA), and the "groups having active hydrogen" of the components (CH)) and a molar ratio of the total number of moles of those "groups having active hydrogen" to the content of all the iso(thio)isocyanate groups are shown in Table 6. In addition, the results of evaluations as performed below are shown in Table 7.

(A): 100 parts by mass of RX-1
(C2): 31.6 parts by mass of TMP
(CH): 486 parts by mass of PTMG 1000
(CH): 64.7 parts by mass of DEG
(Others): 7.1 parts by mass of Hollow Particles 1
(B1): 270 parts by mass of TDI The above obtained urethane resin had a polishing rate of 1.2 μm/hr. a scratch resistance of 4, a Taber abrasion loss of 32 mg, a hardness of 57 in terms of a Shore A hardness, a density of 0.7 g/cm³, and a hysteresis loss of 40%. The results are shown in Table 7.

Comparative Example 6

A cured body was fabricated and evaluated in the same manner as in Comparative Example 5, except that the polymerizable composition having a formulation shown in Table 5 was used. The results are shown in Table 7.

In Comparative Example 6, the resin was fragile, and the resin was broken during the polishing test. Thus, the polishing test could not be carried out.

TABLE 5

| No. | Component (A) (parts by mass) | Component (B2) (parts by mass) | Component (C2) (parts by mass) | Component (CA) (parts by mass) | Other component (parts by mass) | Component (CH) (parts by mass) | Component (B1) (parts by mass) |
|---|---|---|---|---|---|---|---|
| Example 12 | RX-1 (100) | Pre-2 (738) | TMP (22.5) | MOCA (5.2) | Hallow Particles 1 (6.5) | DEG (4.1) | — |
| Example 13 | RX-1 (100) | Pre-2 (1447) | TMP (17.3) | MOCA (62.1) | Hallow Particles 1 (12) | PEG 400 (108.6) | — |
| Example 14 | RX-1 (100) | Pre-2 (738) | TMP (20.8) | — | Hallow Particles 1 (6.4) | DEG (8.2) | — |
| Example 15 | RX-1 (100) | Pre-2 (1476) | TMP (13.9) | — | Hallow Particles 1 (11.9) | PEG 400 (216.9) | — |

TABLE 5-continued

| No. | Component (A) (parts by mass) | Component (B2) (parts by mass) | Component (C2) (parts by mass) | Component (CA) (parts by mass) | Other component (parts by mass) | Component (CH) (parts by mass) | Component (B1) (parts by mass) |
|---|---|---|---|---|---|---|---|
| Example 16 | RX-1 (100) | Pre-2 (738) | TMP (24.3) | — | Hallow Particles 1 (6.5) | 1.4-BuOH (3.5) | — |
| Example 17 | RX-1 (100) | Pre-4 (1224) | Sorbitol (14.1) | DMTDA (8.3) | Hallow Particles 1 (10) | 1.4-BuOH (3.5) | — |
| Example 18 | RX-1 (100) | Pre-4 (816) | TMP (11.6) | MOCA (3.5) | Hallow Particles 1 (7) | PEG 400 (15.5) | — |
| Example 19 | RX-1 (100) | Pre-2 (1476) | TMP (20.8) | IACB (113) | Hallow Particles 1 (12) | — | — |
| Example 20 | RX-1 (100) | Pre-3 (653) | TMP (36.4) | — | Hallow Particles 1 (5.9) | — | — |
| Example 21 | RX-1 (100) | Pre-2 (591) | TMP (6.4) | MOCA (43.1) | Hallow Particles 1 (5.2) | — | — |
| Example 22 | RX-2 (100) | Pre-3 (509) | TMP (17.5) | — | Hallow Particles 1 (3) | — | — |
| Example 23 | RX-1 (100) | Pre-2 (1476) | TMP (34.6) | — | Hallow Particles 1 (12.1) | DEG (32.9) | — |
| Comparative Example 3 | — | Pre-2 (820) | TMP (3.8) | MOCA (103) | Hallow Particles 1 (6.2) | — | — |
| Comparative Example 4 | RX-1 (100) | Pre-2 (1476) | — | — | Hallow Particles 1 (11.8) | DEG (74) | — |
| Comparative Example 5 | RX-1 (100) | — | TMP (31.6) | — | Hallow Particles 1 (7.1) | PTMG 100/DEG (486)/(64.7) | TDI (270) |
| Comparative Example 6 | RX-1 (100) | — | PEG-PPG (706) | — | Hallow Particles 1 (12.2) | PTMG 100/DEG (486)/(64.7) | TDI (270) |

TABLE 6

| No. | Number of moles of functional group n1/n2/n3/(n4)/(nh) | (Number of moles of all the groups having active hydrogen)/(Number of moles of all the iso(thio)cyanate groups) | Number of moles of functional group n1/ns2/n3/(n4)/(nh) | (Total number of moles of the groups having active hydrogen)/(Number of moles of all the iso(thio)cyanate groups) |
|---|---|---|---|---|
| Example 12 | 100/38/61.8/(4.8)/(9.5) | 1.14/1 | 100/19/61.8/(4.8)/(9.5) | 0.95/1 |
| Example 13 | 100/19/23.8/(28.5)/(33.3) | 1.05/1 | 100/9.5/23.8/(28.5)/(33.3) | 0.95/1 |
| Example 14 | 100/38/57/(0)/(19) | 1.14/1 | 100/19/57/(0)/(19) | 0.95/1 |
| Example 15 | 100/19/19/(0)/(66.5) | 1.05/1 | 100/9.5/19/(0)/(66.5) | 0.95/1 |
| Example 16 | 100/38/66.5/(0)/(9.5) | 1.14/1 | 100/19/66.5/(0)/9.5) | 0.95/1 |
| Example 17 | 100/38/28.5/(9.5)/(9.5) | 1.14/1 | 100/19/28.5/(9.5)/(9.5) | 0.95/1 |
| Example 18 | 100/57/47.5/(4.8)/(14.3) | 1.24/1 | 100/28.5/47.5/(4.8)/(14.3) | 0.95/1 |
| Example 19 | 100/19/28.5/(57)/(0) | 1.05/1 | 100/9.5/28.5/(57)/(0) | 0.95/1 |
| Example 20 | 100/25.6/67.2 | 1.08/1 | 100/12.8/67.2 | 0.8/1 |
| Example 21 | 100/47.6/21.9/(49.4) | 1.19/1 | 100/23.8/21.9/(49.4) | 0.95/1 |
| Example 22 | 100/38/76 | 1.14/1 | 100/19/76 | 0.95/1 |
| Example 23 | 100/19/47.5/(0)/(38) | 1.05/1 | 100/9.5/47.5/(0)/(38) | 0.95/1 |
| Comparative Example 3 | 100/0/9.5/(85.5) | 0.95/1 | 100/0/9.5/(85.5) | 0.95/1 |
| Comparative Example 4 | 100/19/0/(0)/(85.5) | 1.05/1 | 100/9.5/0/(0)/(85.5) | 0.95/1 |
| Comparative Example 5 | 0/34.2/77.9 | 1.12/1 | 0/17.1/77.9 | 0.95/1 |
| Comparative Example 6 | 0/34.2/77.9 | 1.12/1 | 0/17.1/77.9 | 0.95/1 |

TABLE 7

| No. | Polishing rate μm/hr | Scratch resistance | Taber abrasion loss (mg) | Hardness | Density (g/cm$^3$) | Hysteresis loss (%) |
|---|---|---|---|---|---|---|
| Example 12 | 3.7 | 1 | 16 | 62 (Shore A harness) | 0.7 | 20 |
| Example 13 | 2.6 | 2 | 27 | 20 (Shore D harness) | 0.7 | 44 |
| Example 14 | 3.6 | 1 | 18 | 57 (Shore A harness) | 0.7 | 19 |

TABLE 7-continued

| No. | Polishing rate μm/hr | Scratch resistance | Taber abrasion loss (mg) | Hardness | Density (g/cm³) | Hysteresis loss (%) |
|---|---|---|---|---|---|---|
| Example 15 | 2.4 | 2 | 30 | 50 (Shore A harness) | 0.7 | 42 |
| Example 16 | 3.4 | 1 | 18 | 58 (Shore A harness) | 0.7 | 21 |
| Example 17 | 2.7 | 2 | 25 | 20 (Shore D harness) | 0.7 | 38 |
| Example 18 | 3.3 | 1 | 20 | 58 (Shore A harness) | 0.7 | 23 |
| Example 19 | 2.5 | 2 | 28 | 35 (Shore D harness) | 0.8 | 52 |
| Example 20 | 3.1 | 1 | 19 | 56 (Shore A harness) | 0.7 | 27 |
| Example 21 | 3.0 | 1 | 18 | 30 (Shore D harness) | 0.8 | 33 |
| Example 22 | 2.9 | 1 | 22 | 59 (Shore A harness) | 0.7 | 31 |
| Example 23 | 2.4 | 2 | 27 | 52 (Shore A harness) | 0.7 | 43 |
| Comparative Example 3 | 0.8 | 5 | 45 | 55 (Shore D harness) | 0.7 | 70 |
| Comparative Example 4 | — | — | — | 48 (Shore A harness) | 0.7 | 47 |
| Comparative Example 5 | 1.2 | 4 | 32 | 57 (Shore A harness) | 0.7 | 40 |
| Comparative Example 6 | — | — | — | 44 (Shore A harness) | 0.7 | 45 |

REFERENCE SIGNS LIST

1: Polyrotaxane
2: Axial molecule
3: Cyclic molecule
4: Bulky terminal group
5: Side chain

The invention claimed is:

1. A urethane resin obtained by reacting a polymerizable composition comprising at least
   a urethane prepolymer (B2) having an iso(thio)cyanate group at an end of a molecule thereof, which is obtained by reacting a bifunctional active hydrogen-containing compound (C1) having two groups having active hydrogen in a molecule thereof and a bifunctional iso(thio)cyanate group-containing compound (B1) having two iso(thio)cyanate groups in a molecule thereof,
   a polyrotaxane (A) having a composite molecular structure formed by an axial molecule and a plurality of cyclic molecules clathrating the axial molecule, in which side chains having a group having active hydrogen are introduced into at least a part of the cyclic molecules, and
   a polyfunctional active hydrogen-containing compound (C2) other than the polyrotaxane (A) and having three or more groups having active hydrogen in a molecule thereof,
   wherein the polymerizable composition contains
      50 to 2,000 parts by mass of the urethane prepolymer (B2), and
      2 to 200 parts by mass of the polyfunctional active hydrogen-containing compound (C2),
         based on 100 parts by mass of the polyrotaxane (A).

2. The urethane resin according to claim 1, wherein the polyfunctional active hydrogen-containing compound (C2) contains a compound in which the group having active hydrogen is a hydroxy group or a thiol group, and a number average molecular weight is 90 to 1,000.

3. The urethane resin according to claim 1, wherein an iso(thio)cyanate equivalent of the urethane prepolymer (B2) is 300 to 5,000.

4. The urethane resin according to claim 1, wherein the polymerizable composition further comprises
   a bifunctional active hydrogen-containing compound (CH) having two groups having active hydrogen selected from a hydroxy group and a thiol group in a molecule thereof.

5. The urethane resin according to claim 4, wherein the polymerizable composition contains
   50 to 2,000 parts by mass of the urethane prepolymer (B2),
   2 to 200 parts by mass of the polyfunctional active hydrogen-containing compound (C2), and
   3 to 200 parts by mass of the bifunctional active hydrogen-containing compound (CH),
      based on 100 parts by mass of the polyrotaxane (A).

6. The urethane resin according to claim 1, wherein the polymerizable composition further comprises
   an amino group-containing compound (CA) other than the polyrotaxane (A) and the polyfunctional active hydrogen-containing compound (C2) and having at least one amino group in a molecule thereof, with the total number of groups having active hydrogen being two or more.

7. The urethane resin according to claim 6, wherein the polymerizable composition contains
   50 to 2,000 parts by mass of the urethane prepolymer (B2),
   2 to 200 parts by mass of the polyfunctional active hydrogen-containing compound (C2), and
   5 to 200 parts by mass of the amino group-containing compound (CA),
      based on 100 parts by mass of the polyrotaxane (A).

8. The urethane resin according to claim 6, wherein the polymerizable composition contains
   50 to 2,000 parts by mass of the urethane prepolymer (B2), 2 to 200 parts by mass of the polyfunctional active hydrogen-containing compound (C2), 3 to 200 parts by mass of the bifunctional active hydrogen-containing compound (CH), and 3 to 200 parts by mass of the amino group-containing compound (CA), based on 100 parts by mass of the polyrotaxane (A).

9. The urethane resin according to claim 6, wherein the amino group-containing compound (CA) contains a compound having a number average molecular weight of 60 to 1,000.

10. The urethane resin according to claim 1, wherein the polymerizable composition further comprises hollow particles.

11. The urethane resin according to claim 10, wherein the polymerizable composition contains 0.5 to 50 parts by mass of the hollow particles, based on 100 parts by mass of the polyrotaxane (A).

12. The urethane resin according to claim 10, wherein the hollow particles are composed of a urethane-based resin.

13. A polishing pad comprising the urethane resin in claim 1.

\* \* \* \* \*